(12) United States Patent
Labsky et al.

(10) Patent No.: US 9,236,045 B2
(45) Date of Patent: Jan. 12, 2016

(54) METHODS AND APPARATUS FOR PROOFING OF A TEXT INPUT

(75) Inventors: Martin Labsky, Prague (CZ); Jan Kleindienst, Nove Straseci (CZ); Tomas Macek, Prague (CZ); David Nahamoo, Great Neck, NY (US); Jan Curin, Prague (CZ); Lars Koenig, Ulm (DE); Holger Quast, Merelbeke (BE)

(73) Assignee: Nuance Communications, Inc., Burlington, MA (US)

(*) Notice: Subject to any disclaimer, the term of this patent is extended or adjusted under 35 U.S.C. 154(b) by 78 days.

(21) Appl. No.: 13/478,930

(22) Filed: May 23, 2012

(65) Prior Publication Data

US 2012/0310643 A1  Dec. 6, 2012

Related U.S. Application Data

(63) Continuation-in-part of application No. PCT/US2011/037535, filed on May 23, 2011.

(60) Provisional application No. 61/489,394, filed on May 24, 2011, provisional application No. 61/568,990, filed on Dec. 9, 2011.

(51) Int. Cl.
*G10L 15/26* (2006.01)
*G10L 13/08* (2013.01)
*G10L 15/14* (2006.01)
*G06F 17/27* (2006.01)

(52) U.S. Cl.
CPC ................ *G10L 13/08* (2013.01); *G10L 15/14* (2013.01); *G06F 17/2785* (2013.01)

(58) Field of Classification Search
CPC ...... G10L 15/22; G10L 15/265; G10L 17/005; G10L 13/08; H04M 2201/40; H04M 1/271
USPC ........ 704/231, 235, 246, 251, 260; 379/88.01
See application file for complete search history.

(56) References Cited

U.S. PATENT DOCUMENTS

| | | | |
|---|---|---|---|
| 6,269,335 B1* | 7/2001 | Ittycheriah et al. | 704/270 |
| 2005/0038657 A1* | 2/2005 | Roth et al. | 704/260 |
| 2005/0235198 A1* | 10/2005 | Howard et al. | 715/500.1 |
| 2006/0074690 A1* | 4/2006 | Xu et al. | 704/276 |
| 2006/0149558 A1* | 7/2006 | Kahn et al. | 704/278 |
| 2006/0167686 A1* | 7/2006 | Kahn | 704/235 |
| 2006/0190256 A1* | 8/2006 | Stephanick et al. | 704/252 |

(Continued)

OTHER PUBLICATIONS

Office Action mailed Oct. 26, 2012 for U.S. Appl. No. 13/478,978.

(Continued)

*Primary Examiner* — Jakieda Jackson
(74) *Attorney, Agent, or Firm* — Wolf, Greenfield & Sacks, P.C.

(57) ABSTRACT

Techniques for presenting data input as a plurality of data chunks including a first data chunk and a second data chunk. The techniques include converting the plurality of data chunks to a textual representation comprising a plurality of text chunks including a first text chunk corresponding to the first data chunk and a second text chunk corresponding to the second data chunk, respectively, and providing a presentation of at least part of the textual representation such that the first text chunk is presented differently than the second text chunk to, when presented, assist a user in proofing the textual representation.

27 Claims, 11 Drawing Sheets

(56) References Cited

U.S. PATENT DOCUMENTS

| | | | |
|---|---|---|---|
| 2007/0033037 A1* | 2/2007 | Mowatt et al. | 704/251 |
| 2007/0055518 A1* | 3/2007 | Doi | 704/246 |
| 2008/0027726 A1* | 1/2008 | Hansen et al. | 704/260 |
| 2008/0140401 A1* | 6/2008 | Abrash et al. | 704/251 |
| 2008/0195370 A1* | 8/2008 | Neubacher et al. | 704/1 |
| 2011/0060587 A1 | 3/2011 | Phillips et al. | |
| 2011/0288862 A1* | 11/2011 | Todic | 704/235 |
| 2011/0288863 A1* | 11/2011 | Rasmussen | 704/235 |
| 2012/0303371 A1 | 11/2012 | Labsky et al. | |
| 2012/0304057 A1 | 11/2012 | Labsky et al. | |
| 2013/0166280 A1 | 6/2013 | Quast et al. | |

OTHER PUBLICATIONS

Office Action mailed May 9, 2013 for U.S. Appl. No. 13/478,978.

* cited by examiner

| Recognized Text Chunk | Error? | Corrected Text Chunk |
|---|---|---|
| "Buy some fine" | Yes | "Buy some wine" |
| "At ten a meeting" | Yes | "Attend a meeting" |
| "It's a grizzly bear" | No | |
| "meeting in the morning" | Yes | |
| . | . | . |
| . | . | . |
| . | . | . |

FIG. 10A

| Recognized Text Chunk | Error? | Corrected Text Chunk |
|---|---|---|
| "Buy some fine" | Yes | "Buy some wine" |
| "At ten a meeting" | Yes | "Attend a meeting" |
| "meeting in the morning" | Yes | |
| . | . | . |
| . | . | . |
| . | . | . |

FIG. 10B

METHODS AND APPARATUS FOR PROOFING OF A TEXT INPUT

CROSS-REFERENCE TO RELATED APPLICATIONS

The present application claims the benefit under 35 U.S.C. §365(c) and §120 and is a continuation-in-part (CIP) of PCT international application PCT/US11/037535, filed May May 23, 2011, and titled "Text Browsing, Editing, and Correction Methods for Automotive Applications," and claims the benefit under 35 U.S.C. §119(e) of U.S. Provisional Application Ser. No. 61/489,394, filed on May 24, 2011, titled "Methods and Apparatus for Dictation Error Correction," and claims the benefit under 35 U.S.C. §119(e) of U.S. Provisional Application Ser. No. 61/568,990, filed on Dec. 9, 2011, titled "Methods and Apparatus for Proofing of a Text Input". Each of the above-identified applications is hereby incorporated by reference in its entirety.

BACKGROUND

The relative difficulty of data entry in mobile or portable devices that have relatively small, inconvenient or otherwise difficult to use input mechanisms (e.g., small keyboards or keypads, or no keypads at all), and/or in devices that are frequently used in environments where the user's hands and/or attention may be occupied or distracted in performing one or more simultaneous tasks, have rendered alternative techniques that supplement or supplant conventional data entry techniques increasingly important and desirable. Speech input coupled with speech recognition, in particular, provides a convenient mode of user input in circumstances where conventional input functionality may be limited, and/or a user's hands and/or attention may be busy, occupied or otherwise distracted. However, speech recognition techniques may be error prone, often resulting in entered data that contain mistakes that may need to be corrected by the user, and/or resulting in data in need of review and editing.

Conventional data entry systems using standard and/or alternative data entry techniques may also provide ineffective and/or inconvenient support for review, error detection and/or error correction (i.e., proofing). For example, conventional approaches to proofing may rely on a user to review entered data, identify errors, and manually correct them. This user-centric approach may place significant demands on the user because the user often must carefully examine the produced text for the presence of errors and expend effort to enter corrections. Having to do so may be distracting to the user who typically must focus attention on proofing and away from other activity and/or must perform editing using inconvenient or limited input devices.

In environments in which data entry is performed concurrent with other activities, or as a secondary task, such an approach may simply be impractical. For instance, in "eyes-busy" environments such as when a user is driving a car, the user's performance on the primary task of driving may be significantly impaired if, in addition to driving, the user were to attempt to proof (i.e., review and/or correct) entered data using conventional proofing techniques. In other situations where the user's attention is (or should be) primarily focused on other activities, conventional data entry and/or proofing may be problematic, and in some cases potentially dangerous. Even under circumstances where a user can devote sufficient or full attention to data-entry and proofing, conventional techniques for doing so may be unnecessarily burdensome on the user (e.g., in circumstances where the data entry device has limited or restrictive input and/or output capabilities).

SUMMARY

In some embodiments, a method for presenting data input as a plurality of data chunks including a first data chunk and a second data chunk is disclosed. The method comprises converting the plurality of data chunks to a textual representation comprising a plurality of text chunks including a first text chunk corresponding to the first data chunk and a second text chunk corresponding to the second data chunk, respectively. The method further comprises providing a presentation of at least part of the textual representation such that the first text chunk is presented differently than the second text chunk to, when presented, assist a user in proofing the textual representation.

In some embodiments, a system for presenting data input as a plurality of data chunks including a first data chunk and a second data chunk is disclosed. The system comprises at least one input for receiving data from the user as a plurality of data chunks including a first data chunk and a second data chunk, a conversion component configured to convert the plurality of data chunks to a textual representation to provide a plurality of text chunks including a first text chunk corresponding to the first data chunk and a second text chunk corresponding to the second data chunk, respectively, and a presentation component configured to provide a presentation of at least part of the textual representation such that the first text chunk is presented differently than the second text chunk to, when presented, assist the user in proofing the textual representation.

In some embodiments, at least one computer readable medium is disclosed. The at least one computer readable medium stores instructions that, when executed on at least one computer, perform method for presenting data input as a plurality of data chunks including a first data chunk and a second data chunk. The method comprises converting the plurality of data chunks to a textual representation comprising a plurality of text chunks including a first text chunk corresponding to the first data chunk and a second text chunk corresponding to the second data chunk, respectively, providing a presentation of at least part of the textual representation such that the first text chunk is presented differently than the second text chunk to, when presented, assist a user in proofing the textual representation.

In some embodiments a method is disclosed, the method comprising identifying at least one text segment, in a textual representation having a plurality of text segments, having at least one acoustically similar word and/or phrase, annotating the textual representation with disambiguating information to help disambiguate the at least one text segment from the at least one acoustically similar word and/or phrase, and synthesizing a speech signal, at least in part, by performing text-to-speech synthesis on at least a portion of the textual representation that includes the at least one text segment, wherein the speech signal includes speech corresponding to the disambiguating information located proximate the portion of the speech signal corresponding to the at least one text segment.

In some embodiments, at least one computer readable medium is disclosed. The at least one computer readable medium stores instructions that, when executed on at least one processor, perform a method. The method comprises identifying at least one text segment, in a textual representation having a plurality of text segments, having at least one acoustically similar word and/or phrase, annotating the textual representation with disambiguating information to help disambiguate the at least one text segment from the at least one acoustically similar word and/or phrase, and synthesizing a speech signal, at least in part, by performing text-to-speech synthesis on at least a portion of the textual representation that includes the at least one text segment, wherein the speech signal includes speech corresponding to the disambiguating information located proximate the portion of the speech signal corresponding to the at least one text segment.

In some embodiments, a system is disclosed, wherein the system comprises at least one input interface for receiving data from the user, a conversion component configured to convert the data into a textual representation, and a presentation component configured to provide an audio presentation of at least a portion of the textual representation by performing: identifying at least one text segment, in a textual representation having a plurality of text segments, having at least one acoustically similar word and/or phrase, annotating the textual representation with disambiguating information to help disambiguate the at least one text segment from the at least one acoustically similar word and/or phrase, and synthesizing a speech signal, at least in part, by performing text-to-speech synthesis on at least a portion of the textual representation that includes the at least one text segment, wherein the speech signal includes speech corresponding to the disambiguating information located proximate the portion of the speech signal corresponding to the at least one text segment.

In some embodiments, a method of error correction using a history list is disclosed. The history list comprises at least one misrecognition and correction information associated with each of the at least one misrecognitions indicating how a user corrected the associated misrecognition. The method comprises converting data input from a user to generate a text segment, determining whether at least a portion of the text segment appears in the history list as one of the at least one misrecognitions, if the at least a portion of the text segment appears in the history list as one of the at least one misrecognitions, obtaining the correction information associated with the at least one misrecognition, correcting the at least a portion of the text segment based, at least in part, on the correction information.

In some embodiments, at least one computer readable medium is disclosed. The at least one computer readable medium stores instruction that, when executed on at least one processor, perform a method of error correction using a history list comprising at least one misrecognition and correction information associated with each of the at least one misrecognitions indicating how a user corrected the associated misrecognition. The method comprises converting data input from a user to generate a text segment, determining whether at least a portion of the text segment appears in the history list as one of the at least one misrecognitions, if the at least a portion of the text segment appears in the history list as one of the at least one misrecognitions, obtaining the correction information associated with the at least one misrecognition, and correcting the at least a portion of the text segment based, at least in part, on the correction information.

In some embodiments, a system for error correction using a history list is disclosed. The history list comprises at least one misrecognition and correction information associated with each of the at least one misrecognitions indicating how a user corrected the associated misrecognition. The system comprises at least one input interface for receiving data from the user, a conversion component configured to convert the data into a textual representation including at least one text segment, a correction component configured to determine whether at least a portion of the text segment appears in the history list as one of the at least one misrecognitions, obtain the correction information associated with the at least one misrecognition if the at least a portion of the text segment appears in the history list as one of the at least one misrecognitions, and correct the at least a portion of the text segment based, at least in part, on the correction information.

BRIEF DESCRIPTION OF DRAWINGS

FIGS. 10A and 10B show examples of history lists that may be used in connection with the method illustrated in FIG. 9, in accordance with some embodiments.

DETAILED DESCRIPTION

Figure 1A:
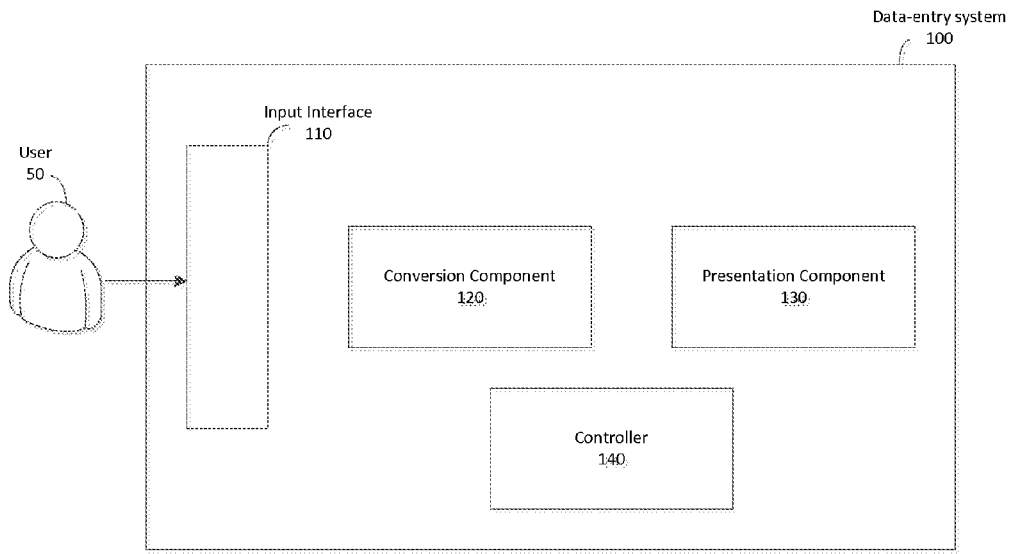
FIGS. 1A and 1B illustrate data-entry systems, in accordance with some embodiments.

As discussed above, conventional data-entry and proofing may be inconvenient and/or too demanding on a user. As used herein, "proofing" refers to reviewing entered data and making any desired changes. As such, proofing may include editing or correcting entered data, but need not include such actions (e.g., after reviewing the data, the user may determine that no changes are to be made). The inconvenience and/or demand of conventional data-entry and proofing may be particularly poignant in circumstances where the user is participating in other activities that require the user's hands and/or attention, or in circumstances where the data entry system has limited input and/or output (I/O) functionality.

The inventors have identified techniques that may facilitate simpler data-entry and/or proofing. Some embodiments may be suitable for tasks where the user is engaged in one or more other activities (e.g., driving, walking, etc.), and/or some embodiments may be well suited for data-entry in a mobile environment and/or when using a data entry device with limited or restrictive I/O capabilities or functionality. However, techniques described herein may be suitable for any data entry task and may be utilized in any environment, for example, in circumstances where conventional data-entry and/or proofing is not available or is inconvenient.

The inventors have appreciated that in environments in which text entry may be performed concurrently with one or more other tasks, or as a secondary task (e.g., while driving a vehicle), techniques that endeavor to maximize the fidelity of entered data and minimize task completion time may be advantageous. In addition, the inventors have appreciated that data entry in environments in which the user may have a different primary task or may otherwise be distracted by other activities, techniques that assist in maintaining a relatively low cognitive load may be desirable.

Proofing entered data, such as data presented as text, typically involves a user reviewing the text, identifying errors and/or edits, determining whether to correct errors or edit the text, and if so desired, correcting or editing the text. The inventors have recognized that one or more of these tasks may be facilitated by the system, and in some cases, may be at least partially automated. In this respect, the inventors have conceived of and/or developed systems and methods that assist the user in proofing a text that has been entered into the system via user input.

According to some embodiments, data may be entered in segments, termed "chunks," each of which corresponds to data input by the user during a single user turn. For example, if data is being entered via speech, a chunk may correspond to a generally contiguous user utterance and/or dictation spoken during a single user-specified or user-indicated interval, as discussed in further detail below. In some embodiments, the user is presented with the entered data as text chunks by distinguishing chunks from one another in the presentation. The user may be permitted to browse or navigate entered data on a chunk-by-chunk basis using either one or both of a visual presentation and an audio presentation of the chunks of entered data, (e.g., the user may perform either visual or auditory chunk-based navigation, or both visual and auditory chunk-based navigation as discussed in further detail below).

The inventors have recognized and appreciated that presenting entered data (e.g., via text on a display and/or via audio playback) to the user using the same chunks in which the data was entered and/or allowing the user to navigate entered data on a chunk basis, may provide for a more convenient, intuitive and/or efficient mode of proofing, or may provide a proofing environment that places less demand on the user. The chunks presented to the user may also be determined by the system and may not correspond precisely to the manner in which the user input the data.

The inventors have appreciated that presenting entered data to user as audio, with or without a visual presentation, may provide a convenient way to proof entered data. In particular, audio playback of data entered by the user allows the user to proof the entered data without the need to visually inspect the entered data. Audio presentation of entered data may also be used in conjunction with a visual presentation as a complement so that the user can benefit from one or both of these techniques of presenting data. The inventors have recognized that during audio playback of entered data, words that sound similar to one another (e.g., homophones such as "bye" and "buy") may complicate the task proofing via audio because a user may not be able to tell what word or phrase is being communicated if they are acoustically the same or similar. The inventors have appreciated that disambiguating acoustically-similar words or phrases may assist a user in proofing entered data via audio playback.

According to some embodiments, acoustically ambiguous words or phrases are identified and presented along with information that helps disambiguate these data segments to the user. For example, the information may indicate the content, meaning or definition of the acoustically ambiguous word or phrase, may use the acoustically ambiguous word or phrase in a sentence to provide context, or may spell the acoustically ambiguous word or phrase. Other methods of disambiguating acoustically similar words or phrases may be used, as aspects of this technique are not limited in this respect.

The inventors have also appreciated that data-entry and/or proofing using systems that utilize some form of automatic recognition (e.g., speech recognition) may be improved by at least partially automating error detection and/or correction. The inventors have recognized that a data-entry system using speech recognition may repeatedly make the same errors across multiple sessions or within a single session. Accordingly, some embodiments relate to methods for detecting and correcting speech recognition errors based on a history of previously-identified errors and how they were corrected by the user.

Some embodiments may be suited to environments in which data entry is performed concurrently with other tasks, performed secondarily to one or more other tasks and/or performed in environments in which a user may be distracted from giving due attention to a presentation of the entered data (e.g., walking, driving, other mobile situations, or other multi-tasking environments). Some embodiments may be suited to environments in which the data entry device (e.g., a mobile telephone, GPS device or dedicated data entry device) has limited or restrictive I/O capabilities and/or functionality. However, the techniques described herein are not limited for use in any particular environment and may be utilized in any environment for any data entry task on any suitable device or device type, as the aspects of the invention are not limited in this respect.

Following below are more detailed descriptions of various concepts related to, and embodiments of, methods and apparatus according to the present invention. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1A shows a data-entry system 100 according to some embodiments that allows a user to enter and proof data input into the system. In particular, data-entry system 100 allows a user 150 to input data to be converted or translated to a textual representation and presented to the user for review and/or editing. To this end, data-entry system 100 includes input interface 110 that allows a user to input data. Input interface 110 may be any one or combination of input devices capable of receiving user input, and may depend on the type of input the system supports. For example, input interface 110 may include one or more microphones that allow the user to dictate information that the user would like to enter into the system. It should be appreciated that input interface 110 may include any type of component, alone or in any combination, that allows a user to input information in any number of different ways, including but not limited to microphone, keypad, touch screen, mouse, writing pad, image capture device, etc., some examples of which are discussed in further detail below.

Data-entry system 100 further comprises conversion component 120 to convert the information input by the user to a textual representation of the information. A textual representation includes any type of representation of alpha-numeric or other symbolic representation of user input that can be stored, presented, transmitted, etc. Conversion component 120 may include one or multiple units to convert a particular type of user input depending on the type of user input the system supports, or may include a plurality of conversion units to convert data input from the user from a plurality of different input types to support multiple input types and methods by which a user can input data, as discussed in further detail below. As used herein, "conversion" or to "convert" refers to receiving data in one format and generating a representation of the data in a different format (e.g., recognizing speech and generating a textual representation of the speech).

When input interface 110 includes one or more microphones to receive user input in the form of speech, conversion component 120 may include one or more automatic speech recognition (ASR) engines to recognize the speech and produce a textual representation of the speech (i.e., to recognize speech as its component words to produce text). However, any conversion component configured to convert a user's input to a textual representation may be used. For example, if a keypad is used, conversion component 120 may include functionality to convert the key presses to the appropriate text. Conversional component may include handwriting recognition when stylus type input is available, or optical character recognition (OCR) when image capture capabilities are provided. Some other examples are discussed in further detail below.

Data-entry system 100 also includes presentation component 130 configured to present the textual representation to the user to facilitate proofing. Presentation component 130 may include one or both of a visual presentation component configured to provide a visual presentation (e.g., a video or display signal) of the textual information, and an audio presentation component configured to present an audio presentation (e.g., a speech signal) of the textual representation. The inventors have appreciated that data-entry system 100 may be used to present textual information to a user that facilitates review, navigation and/or editing of the textual representation that may be more convenient or otherwise more desirable than conventional approaches by, for example, implementing any one or combination of chunk-based presentation, navigation and/or editing, assistance in disambiguating acoustically similar words or phrases, and automatic identification and/or correction of errors in the textual representation, as discussed in further detail below.

Data entry system 100 also includes controller 140 to control one or more aspects of the functionality of the system. For example, controller 140 may include one or more processors for executing software, firmware or microcode programmed to control and/or perform some functionality of input interface 110, conversion component 120 and/or presentation component 130. Controller 140 may include one or more control units, memories, interconnections or other hardware or software functionality to allow communication and interaction between the components of data entry system 100. Controller 140 may be formed from any combination of hardware, software and/or firmware to facilitate operation of data entry system 100.

It should be appreciated that conversion component 120 may be a combination of software and hardware (e.g., program instructions stored on at least one computer readable medium that perform, at least in part, the functionality of the conversion component when executed on one or more processors).

Figure 1B:
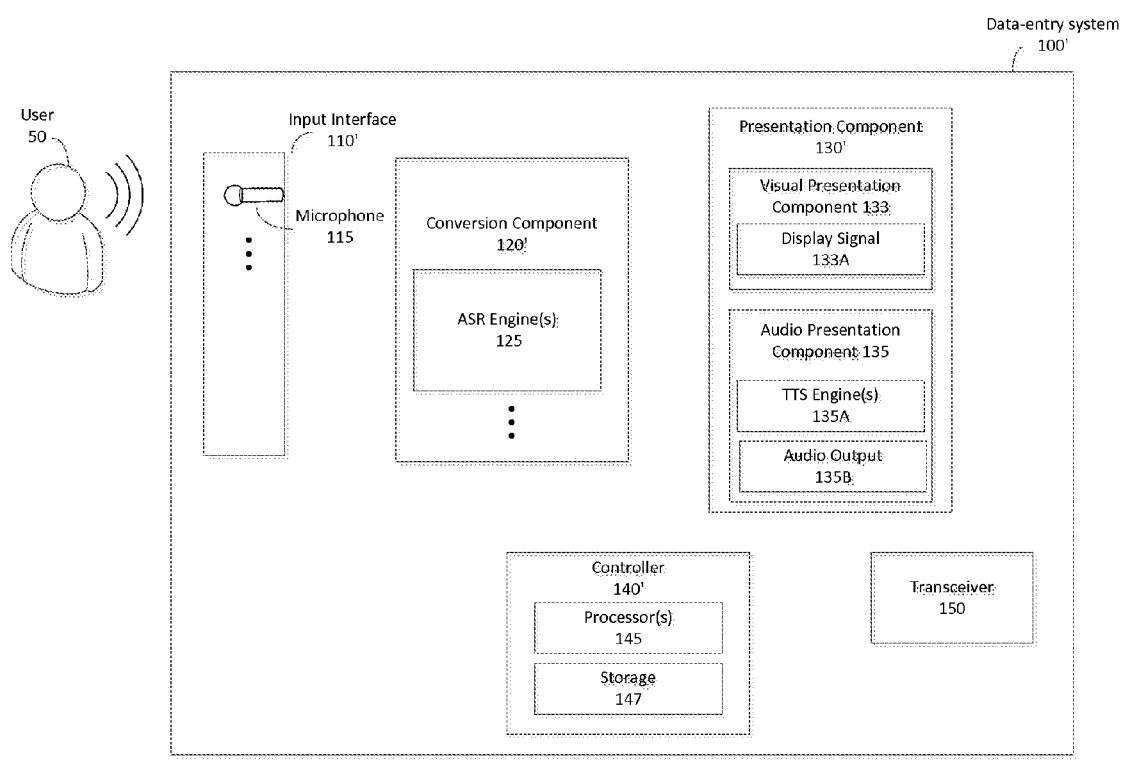

FIG. 1B illustrates a data-entry system 100' configured to convert speech input into a textual representation according to some embodiments. As such, input interface 110' includes one or more microphones 115 for receiving user speech. The one or more microphones may be integrated with or separate from other components of data-entry system 100', and may provide speech signals to one or more other components of data-entry system 100' using any suitable connection (e.g., a wired or wireless connection). Data entry system 100' may also include buttons, switches, a limited or full keypad or other manual input devices that allow a user to input data into the system.

Conversion component 120' includes one or more ASR engine(s) 125 configured to process speech signals received from input interface 110' (e.g., from microphone(s) 115) to produce a textual representation of the speech. ASR engine(s) 125 may comprise one or more computer programs that, when executed on one or more processors, are configured to convert speech signals to text (e.g., programs forming ASR engine(s) 125 may be executed on processor(s) 145 forming part of controller 140). The one or more programs forming, in part, ASR engine(s) 125 may be stored on computer readable media of data-entry system 100' (e.g., on storage 147), or stored on computer readable media located remotely from and accessible by data-entry system 100' via a network connection (when available), as discussed in further detail below. In this respect, ASR engine(s) 125 may comprise a combination of software and hardware (e.g., program instructions stored on at least one computer readable medium and one or more processors to execute the instructions). Conversion component '120 may also include one or more components to convert user input received via other input types in input interface 110' when multiple input types are available.

As discussed above, ASR engine(s) 125 produce text corresponding to the user's voice input, for example, by performing speech recognition on input acoustic waveforms received from the one or more microphones 115 using one or more acoustic models, language models, and/or any one or combination of suitable speech recognition techniques, as aspects of the invention are not limited by the specific implementation of the ASR engine(s). ASR engine(s) 125 may comprise one or more dictionaries, vocabularies, grammars and/or other information that is used during or facilitates speech recognition. ASR engine(s) 125 may reside locally at data-system 100', or may be distributed both locally and/or remotely. For example, none, some or all of the speech recognition functionality may be performed using remote ASR engine(s) accessible at one or more servers over a network. Likewise, resources such as dictionaries, vocabularies, grammars, commands, etc., may be provided locally or accessed from one or more remote locations.

Data-entry system 100' also comprises presentation component 130' that includes a visual presentation component 133 and audio presentation component 135 for providing a visual presentation and an audio presentation of the textual representation, respectively. The visual presentation component 133 and the audio presentation component 135 may present the textual representation simultaneously or, in circumstances when one or the other is not available or not being used, may present the textual information separately. Visual presentation component may include one or more controllers and a display capable of rendering text visually to the user, for example, under control of controller 140, or may include video output capabilities for outputting display data (e.g., a visual presentation) to another device capable of displaying the data and may not itself include a display.

A display may be integrated with or may be separate from other components of data-entry system 100'. For example, in some embodiments, data-entry system 100' is implemented as a dedicated device and may have an integrated display. In other embodiments, one or more components of data-entry system 100' are implemented on a mobile device such as a mobile telephone or global positioning satellite (GPS) device and may therefore use the display capabilities of the mobile device. In some embodiments, data-entry system 100' may utilize the display capabilities of another device (e.g., mobile telephone or GPS device) without being otherwise implemented on the other device or may be partially implemented on a separate device, as discussed in further detail below.

Audio presentation component 135 includes text-to-speech synthesis (TTS) engine(s) 135A and one or more audio output components 135B, the latter of which may include components capable of providing audio signals (e.g., an audio presentation), or may include one or more speakers to produce audible sound from an audio presentation. In some embodiments, data-entry system 100' is implemented as a dedicated device and therefore may have integrated speakers and controllers for rendering audio. In other embodiments, one or more components of data-entry system 100' are implemented on a mobile device such as a mobile telephone or GPS device and may therefore use the audio capabilities of the mobile device. In some embodiments, data-entry system 200 may utilize the audio capabilities of another device (e.g., mobile telephone, GPS device, wireless or wired headphone or earpiece, etc.) without otherwise being implemented on the other device or may be partially implemented on another device, as discussed in further detail below. Accordingly, audio presentation component may include the functionality to generate an audio presentation (e.g., a speech signal) alone or may include one or more components capable of rendering audio presentation (e.g., one or more speakers).

TTS engine 135A may comprise one or more computer programs that, when executed on, e.g., processor(s) 145, convert a textual representation into speech. The one or more programs forming, in part, TTS engine(s) 135A may be stored on computer readable media of data-entry system 100', (e.g., storage 147) or stored on computer readable media located remotely and accessible by data-entry system 100' via a network connection (when available), as discussed in further detail below. TTS engine(s) 135A may use any suitable approach to speech synthesis including, but not limited to, one or any combination of concatenative, formant or model-based approaches, articulatory, HMM-based, sinewave synthesis, etc., as aspects of the present invention are not limited to any specific implementation of a TTS engine. TTS engines(s) 135A may be configured to synthesize speech in any desired language and/or dialect.

TTS engine 135A may synthesize speech using one or more voice types and each voice type may be characterized by a voice font. A voice font may comprise parameters that define voice characteristics such as pitch or pitch contour, speaking rate, volume, speaker type (e.g., male/female adult voice, male/female voice, a voice having a particular accent or dialect, etc.). Accordingly, TTS engine(s) 135A may synthesize one portion of a text segment using one voice font and another portion of the text segment using another voice font. TTS engine(s) 135A may be configured to produce speech that mimics the speech of the user, expresses emotion, or that utilizes any other suitable TTS technique to generate desired speech and/or voice characteristics.

As discussed above, processor(s) 145 may be configured to execute a plurality of computer-readable instructions that form, in part, ASR engine(s) 125 and/or TTS engine(s) 135A. Data-entry system may include data storage 147, for example, one or more computer readable media, for storing programs associated with the functionality of the system as well as for storing input provided to the data-entry system. Input may include voice and non-voice (e.g., keypad, written and/or image information) input. Data-entry system 100' may store the input and any data/information associated with processing the input in data storage 147. For instance, an input speech waveform, text converted from the input speech waveform, and results provided by the ASR engine(s) 225 may be stored in data storage 147. Data storage 147 may include computer readable media local to data system 100' or that is located remotely and accessible by the system.

Data-entry system 100' may be a stand-alone system or may be connected to a network. For example, data-entry system 200 may be connected wirelessly or via a wired connection to a cellular network, a local area network, the Internet, or through short distance communication such as Bluetooth or infrared communications. In this respect, data-entry system may include transceiver 150 that allows the system to wirelessly or via a wired connection communicate with other components, computers, networked devices, etc. In this way, data-entry system 200 can communicate with external devices using a wired or a wireless connection, using any suitable network and communication protocol. Data-entry system 100' may be implemented as a special purpose device, may be implemented on another device (e.g., a mobile device, or an embedded system) or may utilize certain functionality of one or more other devices (e.g., display, audio, etc.).

As discussed above, the inventors have appreciated that presenting and allowing for navigation and/or editing by chunks may provide for improved data-entry and/or proofing. When a system is operating on chunks (e.g., presenting, navigating or editing), the system is referred to as operating in chunk mode. As discussed above, a chunk refers to one or more words input during a single user turn. A single user turn may be defined in a number of ways. For example, when a user inputs data via speech, a turn may be demarcated by a pause in a user's speech that exceeds a threshold, which may be manually set or automatically determined. If the length of the pause exceeds the threshold, the data-entry system may determine that the turn is over and process any dictation received before the pause occurred (and after a previous chunk). The corresponding recognized text may be processed and handled as a single chunk (e.g., presented and manipulated as a single chunk).

In some embodiments, a user may explicitly indicate to the data-entry system that a turn has ended. For example, some embodiments of a data-entry system may include a button, switch or other mechanism that the user can actuate to indicate the beginning and/or end of a chunk of information (e.g., a user may press a button to begin dictating and/or may press a button (or release a button) to indicate that a chunk of data has been dictated or otherwise entered). In some embodiments, a user may say a keyword such as "stop" or "end" to indicate the end of a chunk. The system may automatically detect speech to indicate the beginning of a chunk, the user may use a command such as "start" or the user may press a button or activate a mechanism to indicate the beginning of a chunk.

It should be appreciated that these exemplary techniques for identifying a chunk may be used alone or together in any combination, or other techniques may be used. For example, pause detection can be used in conjunction with explicit techniques such as pressing a button and/or speaking a command. It should be appreciated that a chunk may be of any size and may depend on how a user inputs information and/or the sophistication or preferences of the user, and may comprise one or more characters, one or more words, one or more phrases, one or more sentences, and/or one or more paragraphs, etc.

While a chunk is often one or more words, it should be appreciated that a chunk may be a portion of a word in some circumstances. For example, when a user enters text via spelling, the user may spell a word over the course of multiple turns. Consider an example of a user spelling the word "cucumber," wherein the user dictates the letters "CUCU,"

and then may pause or otherwise indicate the end of a turn, and then dictate the letters "MBER," during a second turn. Unless the user indicates otherwise, the system would treat the two word portions as separate chunks.

Figure 2:
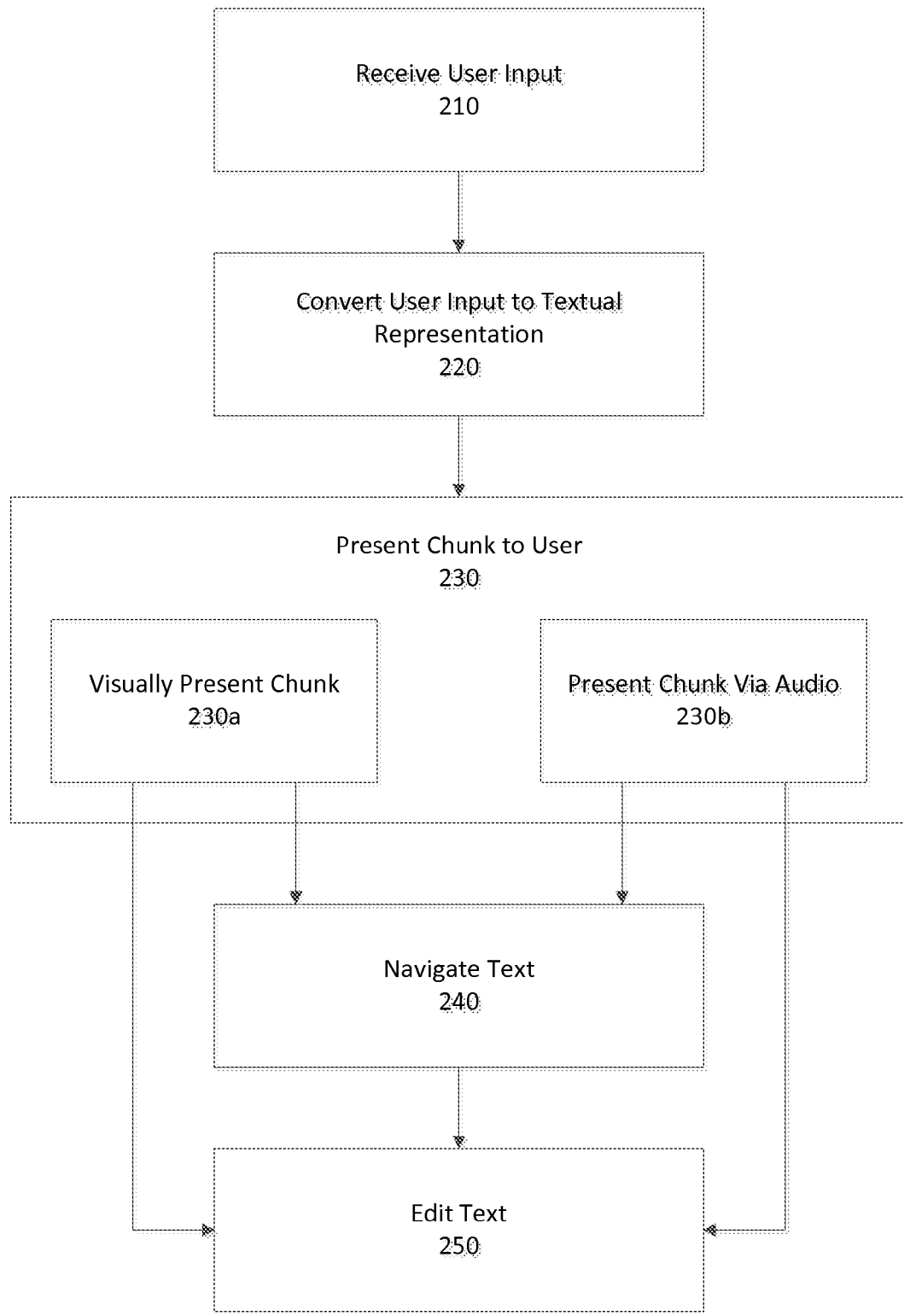
FIG. 2 shows a method of chunk-based presentation, navigation and/or editing, in accordance with some embodiments.

FIG. 2 illustrates a method of presenting, navigating and/or editing textual information in a chunk mode of operation, in accordance with some embodiments. Method 200 may be performed on any of the data-entry systems described herein, or any other suitable system capable of presenting textual information to a user in chunks. In act 210, user input corresponding to a single chunk is received. The user input may be speech, or may be other types of input such as keypad input, hand-writing using a stylus or other writing tool, touchpad data, image information, etc.

In act 220, the user input is converted into a textual representation corresponding to a single text chunk, referred to as the current chunk. The type of conversion may depend on the type of user input received. For example, if the user inputs information via speech, the user input may be converted into a textual representation using one or more ASR techniques. If the input is keypad information, the user input may be converted by translating the key presses into textual information. Hand-writing may be converted using hand-writing recognition techniques and image information may be converted using OCR techniques, etc.

Independent of the conversion technique, a current chunk corresponding to the user's input is generated. At least some aspects of chunk-based presentation derive from the inventors' appreciation that it may be advantageous to treat the current chunk differently than chunks resulting from previous user input. For example, emphasizing the current chunk may facilitate easier review of the current chunk by making the current chunk stand-out from other chunks. In particular, emphasizing the current chunk may draw the user's focus to the chunk corresponding to the user's most recent input. When a chunk is emphasized, it is referred to as the active chunk. In some embodiments, the current chunk becomes the active chunk upon presentation. However, during navigation of text, the active chunk may change to other chunks either automatically by the system or by user selection of different chunks of text, as discussed in further detail below.

In act 230, the current chunk is presented to the user according to one or more available and/or selected presentation modes. In some embodiments, a visual presentation mode may be available and/or selected. In such circumstances, act 230a may be performed to generate a visual presentation (e.g., display data) of the current chunk and/or other previously entered chunks. For example, chunks that have been entered in a session may be presented on a display with the current chunk emphasized, thus making the current chunk the active chunk. The active chunk may be highlighted in any way that tends to draw the focus of the user or indicate to the user that the chunk is the active chunk. For example, the active chunk may be highlighted in bold or italic or given a larger font size, may be given a particular color, may be emphasized using a highlight box, etc. Any method of emphasis may be used, as the aspects of the invention are not limited in this respect.

In addition to emphasizing the active chunk to distinguish it from other chunks, some embodiments include presenting chunks in different ways to distinguish chunks from one another (e.g., presenting at least some non-active chunks in ways that distinguish them from each other and/or distinguish them from the active chunk). For example, each chunk may be presented using a different color so that the user can quickly see where one chunk ends and another chunk begins. Alternatively, chunks may be given different fonts or patterns to differentiate one chunk from other chunks, particularly neighboring or adjacent chunks, may be boxed to emphasize the boundary of each chunk or demarcated in other ways, as discussed in further detail below.

In some embodiments, an audio presentation mode may be available and/or selected. In such circumstances, act 230b may be performed to provide the current chunk an audio presentation (e.g., speech signal) of the current chunk. For example, upon converting the user input to a current chunk, the current chunk may be synthesized to speech using TTS technology and played back to the user. As with a visual presentation, the current chunk may default to the active chunk upon conversion and then be played back to the user, thus emphasizing or highlighting the active chunk by virtue of having played it back via audio. In this way, the user can hear the results of the conversion of the user's latest input. Providing an audio presentation to the user may be particularly advantageous in situations where the user's eyes or visual attention is focused elsewhere or it is otherwise difficult for a user to look at or focus on a display, or where no display is available. As discussed in further detail below, the chunk may be selected as the active chunk, upon which an audio presentation of the new active chunk may be generated.

It should be appreciated that visual presentation and audio presentation may be performed alone, or in circumstances where both are available and selected, visual and audio presentation can be performed together. When audio and visual presentation are performed together, the two presentation modes may complement one another and/or may be confirmatory of one another, or may reduce the cognitive load of using either one of the presentation modes by itself.

In act 240, chunk-based navigation can be performed by changing which chunk is the active chunk (e.g., which chunk is emphasized and/or has the focus for subsequent editing operations). Changing which chunk is presented as the active chunk can be performed in numerous ways. For example, the user may indicate to the system that a different chunk should be selected as the active chunk. In some embodiments, the user may vary the active chunk by actuating a button (e.g., an arrow key) or some other mechanism that moves the active chunk in one direction or the other, or otherwise indicates that a particular chunk should be selected as the active chunk. The active chunk may also be selected or moved using voice commands, or may be selected or varied using a combination of voice commands and other indications (e.g., a button, rotary knob, touchpad or other mechanism allowing for chunk navigation). The active chunk may be varied one chunk at a time or moved to a more distant chunk such as the beginning or end chunk of a given text, as text navigation is not limited to any particular navigation style.

In this manner, a user can navigate text by selecting a particular chunk to be active or moving the active emphasis until it emphasizes a desired chunk. For audio presentation, according to some embodiments, only the active chunk is played back to the user, thus emphasizing the active chunk via audio. In other embodiments, the active chunk is presented via audio first and then subsequent chunks, if any, are also played back to the user. The active chunk may be positioned anywhere in the text in order to playback desired chunks. When visual and audio presentations are used together, a user may be able to visually select the active chunk so that the chunk of interest can be audibly played back to the user for review.

Chunk-based navigation and/or editing of text may involve using one or more special items to aid in tasks of navigation and/or editing. Similar to chunks, the special items may become active during navigation and/or editing of text. In some embodiments, a beginning-of-text item and/or an end-of-text item may be used. Each of these items may be selected as an active item in any suitable way and, for example, may be selected as an active item in any of the above-described ways in which a chunk may be selected as an active chunk. When a beginning-of-text item is selected to be active, newly converted text may be inserted at the beginning of the text and when an end-of-text item is selected to be an active item, newly converted text may be inserted at the end of the text being navigated and/or edited.

The beginning-of-text and end-of-text items may be presented visually to a user, if a display is available. This may be done in any suitable way. For example, the beginning-of-text item and end-of-text items may be presented as a space or any other suitable special character or symbol that becomes visually highlighted when selected to be active. The visual highlighting may be achieved by using shading, a different font, underlining, highlight box, reverse highlighting, blinking, or any other suitable technique for highlighting the beginning-of-text and end-of-text items. During an audio presentation, the beginning-of-text and/or end-of-text items may be audibly rendered, for example, by having the TTS engine speak "beginning of text" or "end of text" or any other suitable audible alert that the beginning of the text and/or the end of the text has been reached.

As discussed above, aspects of the techniques described herein allow a user to proof text and, if desired, correct for errors introduced by the system in converting user input into a textual representation or make any changes to the text that the user desires. In act 250, editing may be performed on a textual representation. In some embodiments, the active chunk may additionally obtain editing focus so that further editing instructions are performed on the active chunk. In some embodiments, when a particular chunk is active, the user may edit the active chunk using further user input. For example, the user may speak new information to replace the active chunk, or use voice commands to replace the active chunk or specific words within the active chunk. Numerous editing operations may be performed when a user has determined that selected text should be changed, for example, because there was an error during conversion, or the user simply wants to input different information into the system, as discussed in further detail below.

Figure 3B:
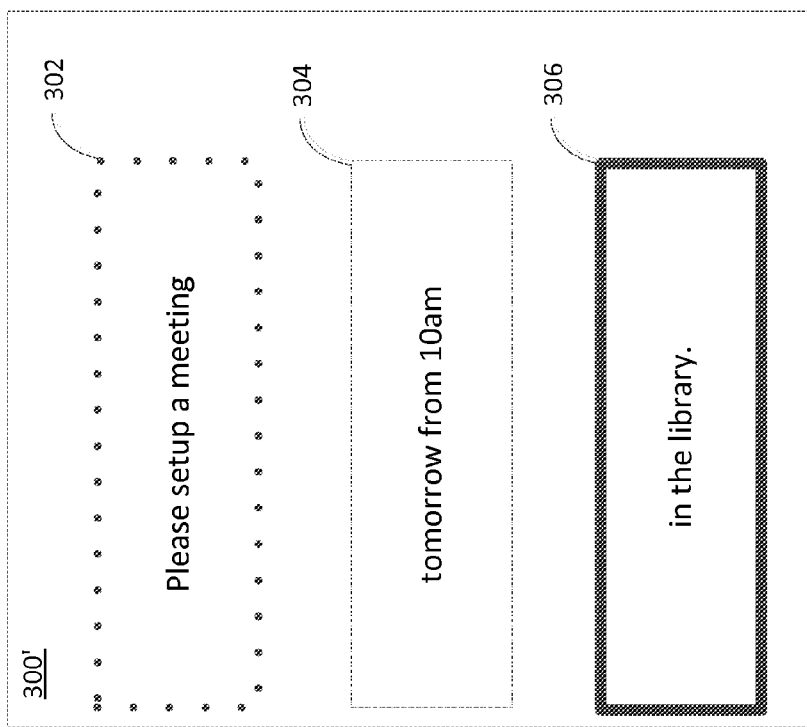
FIGS. 3A and 3B show examples of a visual presentation of a textual representation, in accordance with some embodiments.
Figure 3A:
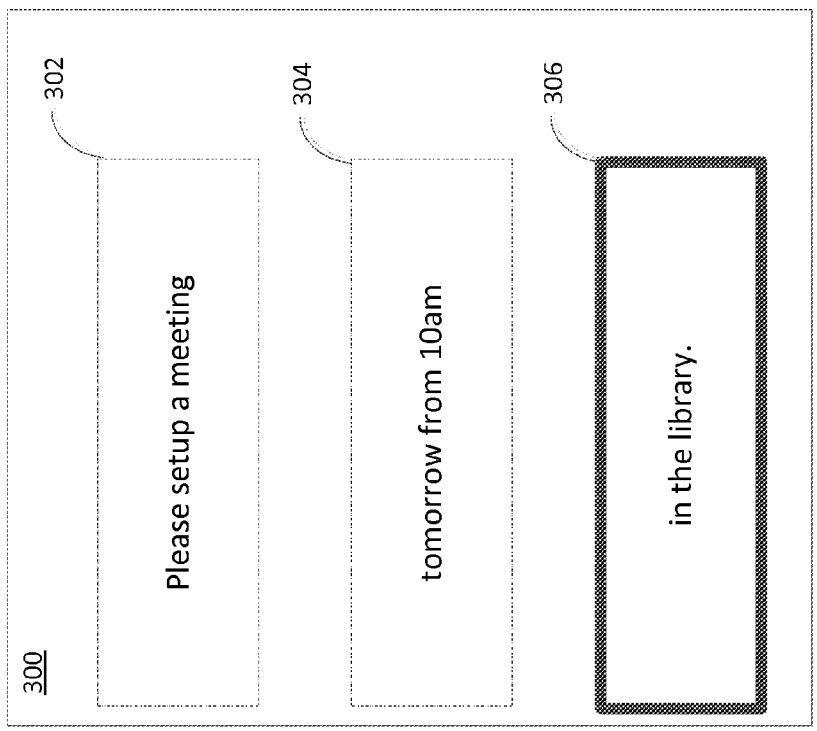

FIG. 3A illustrates a visual presentation of an exemplary sentence entered into a data-entry system using chunk mode. Specifically, the sentence "Please setup a meeting tomorrow from 10 am in the library" was input by a user into a data-entry system in three turns to produce three different chunks of text. Text segment "Please setup a meeting," was dictated during a first turn and converted to first chunk 302, text segment "tomorrow from 10 am," was dictated during a second turn and converted to second chunk 304, and "in the library," was dictated during a third turn and converted to third chunk 306. As discussed above, each turn resulting in a separate chunk may be demarcated using any suitable indication, such as a user actuating a button or switch to indicate the beginning or end of a turn, a pause in speaking that exceeds a threshold, one or more voice commands, etc.

A visual presentation of the textual representation may be presented on a display 300 that presents chunks 302, 304, and 306 to a user, and which may be coupled to a data-entry system, may be integrated with the data-entry system, or may be utilized by the data-entry system. The chunks that have been converted by the system may be shown on a display in any suitable way. As discussed above, chunks may be displayed to be visually distinct from one another, particularly with respect to neighboring or adjacent chunks. In some embodiments, text chunks may be visually distinguished from one another by color. For instance, a three-color scheme may be employed to ensure that no two neighboring chunks have the same color, though other color schemes may be used. Additionally or alternatively, other techniques for visually distinguishing chunks from one another may be employed including using shading, underlining, different fonts, different font sizes, and/or visually separating chunks apart from one another (e.g., using spaces, carriage returns, etc.).

As discussed above, to facilitate navigating (also referred to as browsing) and/or editing entered text in chunk mode, one of the previously-entered chunks may be designated as an active chunk. A chunk may be automatically designated as active (e.g., the most recently input and converted chunk may automatically default to the active chunk) or may be designated manually by a user. If a display is available, the active chunk may be visually highlighted by using shading, a different font, underlining, highlight box, reverse highlighting, blinking, or in any other suitable technique for highlighting the active chunk. In the example shown in FIG. 3A, chunk 306 is indicated as active by a box with a solid line, while other non-active chunks are indicated by boxes with dashed lines. This emphasis is used to generically denote any of the possible types of emphasis that can be used to highlight the active chunk.

As discussed above, any of the entered text chunks may be designated as the active chunk. For example, the last text chunk entered may be selected as the active chunk and may operate as the default active chunk as data is being input into and converted by the system. The active chunk may change as the user is navigating through text chunks and may correspond to the last chunk the user has selected or otherwise indicated as the chunk for which focus is desired. As the active chunk changes, the text of the new active chunk may be visually emphasized and/or played back to a user using TTS and audio playback.

FIG. 3B illustrates a visual presentation where the active chunk 306 is emphasized and the two other chunks 302 and 304 are presented differently from one another. By presenting chunks differently, it may be easier for a user to quickly ascertain where one chunk begins and another ends. Such techniques may facilitate reducing the cognitive load on the user during proofing.

Figure 4A:
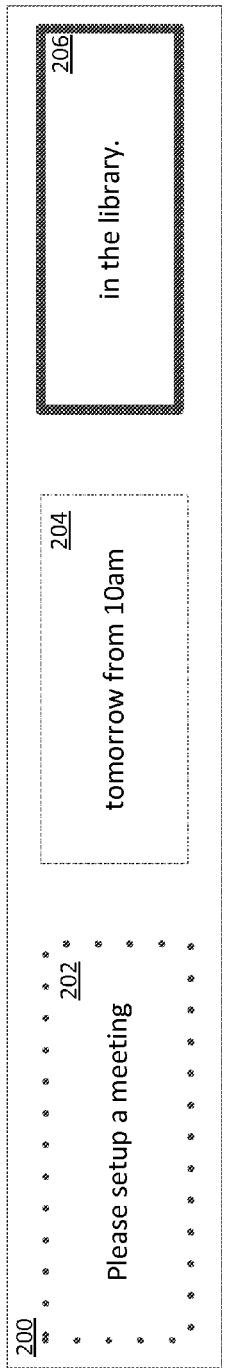
FIGS. 4A-4C illustrate chunk-mode navigating of a textual representation, in accordance with some embodiments.
Figure 4B:
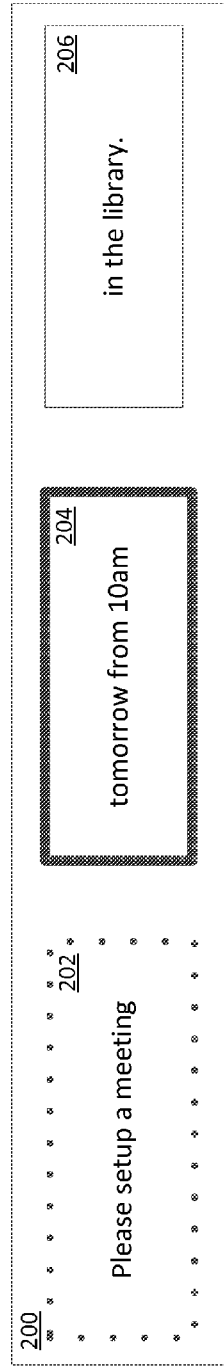
Figure 4C:
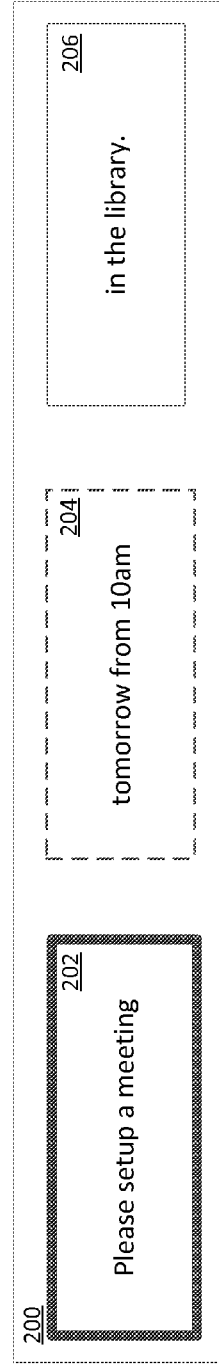

As discussed above, techniques described herein may facilitate navigating text entered into the system. For example, previously-entered text may be navigated by a user in chunk mode as illustrated in FIGS. 4A, 4B, and 4C. These figures show a progression of three snapshots of a visual presentation of a textual representation, for example, that is provided for display to the user on a display 200 as the user navigates through chunks 206, 204, and 202.

For example, the active chunk may initially be the last chunk entered (chunk 206). The user may decide that text should be changed in chunk 202 and navigate to the beginning to do so. As the user sequentially browses from chunk 206, to chunk 204, and finally to chunk 202, each of these chunks may become active, and therefore emphasized as such, and the user may be shown the screen sequence illustrated to FIGS. 4A, 4B, and 4C, respectively, wherein a solid box denotes any manner of emphasizing the active chunk.

In addition to browsing chunks sequentially, as in the above-described example, a user may cycle through the chunks so that the user may loop from the last chunk in the text to the first chunk in the text without navigating through any of the chunks between the first and last chunks in the text. For example, the user may navigate to the left of the first text chunk (or beginning-of-text item) such that the last text chunk (or end-of-text item) becomes the active item. Similarly, the user may navigate to the right of the last text chunk (or end-of-text item) such that the first text chunk (or beginning-of-text item) becomes the active item. It should be appreciated, that text navigation with cycling as described above may be enabled with or without the use of beginning-of-text and end-of-text items, as aspects of the present invention are not limited in this respect.

Alternatively, the user may navigate by jumping to a desired location in the text, such as the beginning or end of the text (e.g., by using a voice command such as "Go to Beginning," or by pressing a button or other mechanism having functionality to move the active chunk or item). The user may select a particular chunk to be active using voice commands, for example, by speaking the word "Select" and then speaking the content of the chunk that the user would like to select and/or make the active chunk, or may speak a command to select an item (e.g., the beginning or end of the text) to make the active item.

Non-active chunks may be presented to distinguish them from the active chunk and/or other non-active chunks. In FIGS. 4A-4C, the non-active chunks are presented differently. Adjacent chunks may be distinguished in any manner, for example, adjacent chunks may be presented using different colors, different fonts or any other type of characteristic such that one or more adjacent chunks are presented differently and/or a desired number of contiguous chunks (e.g., a number of chunks proximate to the active chunk) are each presented differently and/or distinctly. As discussed above, navigation/browsing may be performed via voice commands, buttons or other mechanisms, or any other suitable method of varying or selecting the chunk for which emphasis or focus is desired.

The audio output capability of a data-entry system may also be used to navigate through entered text. In some embodiments wherein an audio presentation is generated, available and/or selected, whenever a user navigates to a chunk (which may consequently become active), the selected chunk may be presented as audio (e.g., by using TTS synthesis to synthesize speech from the active chunk, with or without a corresponding visual display). The audio presentation (e.g., a speech signal) may be audibly rendered via one or more speakers or other audio component.

If a display is available and enabled, both the visual presentation on the display and audio presentation via speakers may be rendered to the user. However, in instances wherein no display is available, or the display has been disabled (e.g., a driver may want to disable the visual presentation while driving to avoid distraction), the converted textual representation may be rendered as audio only. In some embodiments, just the active chunk is played back via audio. Alternatively, the active chunk may be played back followed by any subsequent chunks.

TTS capabilities of a data-entry system may also be used in other ways. For instance, the user may request that an active text chunk be spelled out, which may be useful if the user wants to verify whether an intended word was recognized or if a word that sounds similar to the intended word was recognized (e.g., "buy" vs. "by"). Accordingly, TTS synthesis may be used for disambiguating among text segments that sound similar to one another in order to help the user browse and edit entered text. Other techniques for disambiguating acoustically-similar text segments, including one or more automated techniques, are discussed in further detail below.

As discussed above, editing of entered text may be facilitated using one or more techniques described herein. For example, in chunk mode, a user may edit an active chunk. The user may delete the active chunk, in which case after deletion, the active chunk may be automatically set to one of the neighboring chunks of the deleted chunk or any of the other previously-entered text chunks. The user may indicate that an active chunk should be deleted in any of numerous ways. For example, the user may speak a command, such as "delete," to the data-entry system, or the user may press a button or activate another mechanism to delete an active chunk. The user may also replace the active chunk with different text or a portion of the active chunk with alternative text. The user may replace text using voice commands or may indicate that other text is to replace the active chunk or portion of the active chunk in other ways (e.g., in ways analogous to a "cut-and-paste" operation). The user may edit entered text in other ways, as the aspects of the invention are not limited in this respect.

Figure 5A:
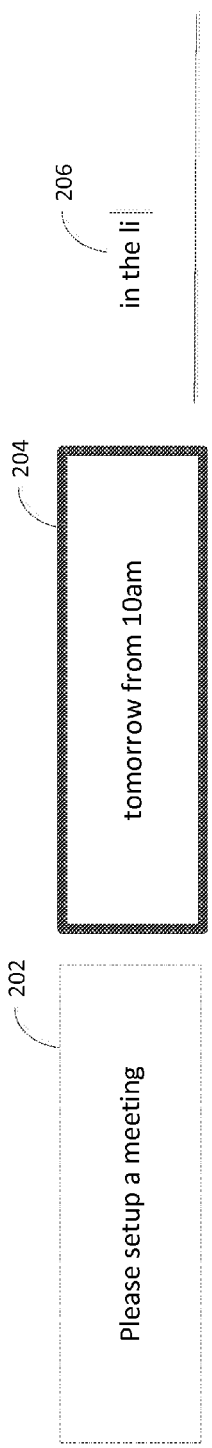
FIGS. 5A-5D illustrate chunk-mode editing of text, in accordance with some embodiments.

FIGS. 5A-5D show examples of editing a text in chunk mode. In the examples in FIGS. 5A and 5B, entered text is shown as being inserted after the active chunk (e.g., in an insertion mode). Once a current chunk has been input and converted, it may then be presented as the active chunk, though this does not need to be the case. In FIG. 5A, chunk 204 comprising the text "tomorrow from 10 am" is indicated as active (once again by using a box with a solid line, though any other visual emphasis may be employed), while the next chunk, chunk 206, is being entered. In this example, the chunk that was entered last (chunk 204) is designated as the active chunk.

In FIGS. 5A-5D, text being entered is depicted with an underline and some portion of the text chunk displayed to denote that text is being entered. However, it should be appreciated that a chunk of data being entered may not become part of the visual presentation until after the chunk is fully input and converted, at which time the chunk may then become the active chunk. Accordingly, data being entered may not immediately be presented as suggested in FIGS. 5A-5D, which is shown as such in the drawings to illustrate that data is being entered into the system. However, in some embodiments, data being entered may be converted and presented as the data is being entered without waiting for the entire chunk (or other segment) of data to be input.

Figure 5B:
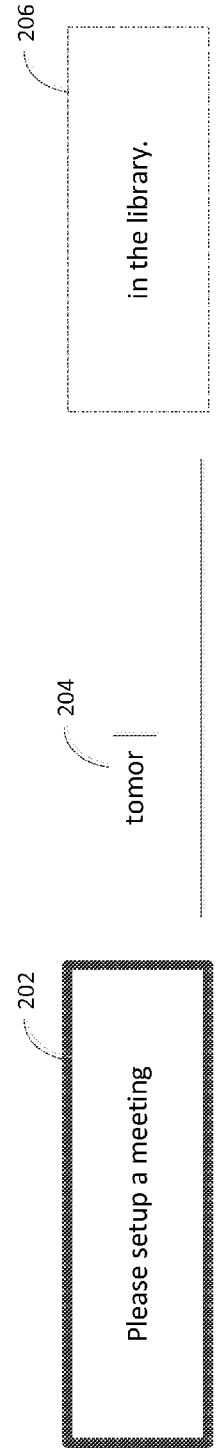

FIG. 5B illustrates exemplary insertion of text into previously entered text. The sentence "Please setup a meeting in the library" may have been entered first in two turns resulting in two chunks. The user may then decide that further text should be inserted between the chunks. To achieve this, the user may select chunk 204 as the active chunk and input the text chunk "tomorrow from 10 am" so that it is inserted between the two already-entered text chunks. In such an insertion mode, user input is converted and presented just after the active chunk. Alternatively, the system could operate in or be placed in a replace mode where user input is converted and replaces the active chunk, as discussed in further detail below.

Figure 5C:
Figure 5D:
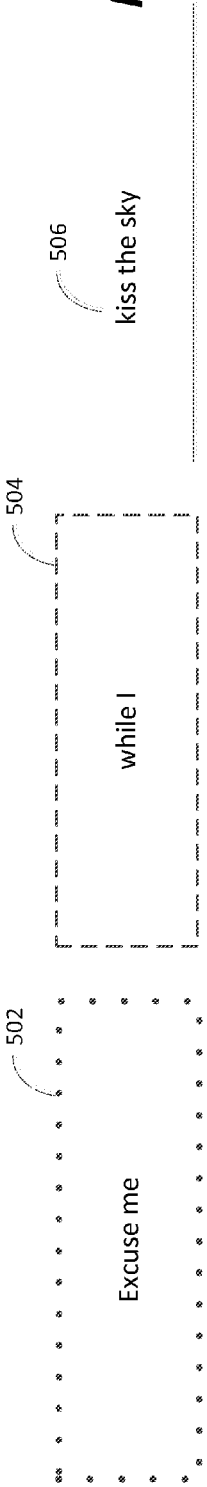

FIGS. 5C and 5D illustrate a user editing a recognition error made during conversion of the user input. For example, a user has dictated the phrase "Excuse me, while I kiss the sky," in three separate chunks. As each chunk is presented, the user may visually confirm that the conversion was correct. In some embodiments, the last chunk to be converted is presented as the active chunk so that the user can quickly focus on the chunk and confirm that it reads as intended. In this example, the conversion process incorrectly converts the speech corresponding to "kiss the sky" to "kiss this guy."

Once converted, this chunk may be emphasized as the active chunk as shown in FIG. 5C so that the user can quickly focus on this chunk.

The inventors have appreciated that presenting the text in chunks, distinguishing chunks from each other via the presentation, and/or emphasizing an active chunk may facilitate more convenient proofing, and may reduce the cognitive load on the user (who may be also simultaneously performing another task such as driving, walking, etc.), or otherwise facilitate more convenient text proofing.

As illustrated in FIG. 5D, the user detected the error and replaced the text "kiss this guy" with the correct text "kiss the sky." This edit may be performed using any of the techniques described above. For example, the user may perform the edit using a voice command such as "Replace 'kiss this guy' with 'kiss the sky.'" As another example, the user may perform the edit using a voice command such as "I said 'kiss the sky.'" In these examples, the system may perform the replacement on text in the active chunk or any other suitable part of the text. For example, the system may search any or all of the previously-entered text to find text most acoustically-similar to the phrase "kiss the sky."

Other commands such as "Change to the sky" may be used or any command syntax and grammar that the system has implemented. The user may also replace the text using a delete and insert command such as by speaking "Delete this guy" followed by speaking "Insert the sky." The user may use commands such as "delete whole text," "undo/redo," "to uppercase/to lowercase," "capitalize," etc. Voice can be used to edit in ways that may be more natural than a strict command vocabulary. For example, a user may have dictated "Please buy wine" and the text entry system recognized and presented "Please buy line" to the user. To make a correction, the user may issue a command such as "I meant wine" to implicitly indicate what is to be changed and explicitly indicate the correction.

Alternatively, to avoid repeat misrecognition, the user may spell the correction by, for example, saying "Spelling S K Y," or by entering a spell mode in any suitable way and spelling the correction directly by saying "S K Y." It should be appreciated that any method of using voice, such as any command language, vocabulary or grammar may be implemented, as the aspects of voice editing and/or command editing are not limited to any particular implementation.

The user may also edit the active chunk by pressing a button, such as a delete button provided on a user interface of the system or provided as part of the environment (e.g., as a button on the steering wheel in a car implementation). The user may edit the text using a keypad, mouse or any other suitable input device. Editing using voice commands and other types of input may also be used in combination with each other to edit a presented text. Edits may be performed on the entire chunk or a portion of the chunk, depending on the editing commands issued by the user and/or depending on the mode in which the system is operating (e.g., chunk mode, word mode, character mode, etc.), or may be performed on other units of different sizes as discussed in further detail below.

As described above, a user may replace text by using a "delete" command to remove text followed by an "insert" command to insert text in place of the deleted text. The inventors have recognized that there may be more economical ways of implementing a replace operation than having a user issue two different commands. Accordingly, in some embodiments, the system may operate in a so-called "replace/insert" mode (also referred to as a "boundary-insert" mode, whereby an active chunk or item may be replaced by other text without having to delete the active chunk or item first. A system may be configured to operate in the replace/insert mode in addition to or instead of the previously-described "insert" mode in which new text is inserted after the active chunk or item.

Chunk-based navigation and/or editing of text in replace/insert mode may involve using one or more special items, called "boundary items" to aid in tasks of navigation and/or editing. A boundary item may be associated with a boundary between two adjacent text chunks in the text. Though, in some instances, a boundary item may be associated with a boundary between any two adjacent text units such as a boundary between two adjacent phrases, a boundary between two adjacent words, a boundary between two adjacent characters, etc. Each boundary item may be active, just as a chunk may be active. When a user provides input while a boundary item is active, the text corresponding to the input may be inserted between the adjacent text items, optimally with white space and punctuation adjusted accordingly, though automatic adjusting of white space and punctuation is not required.

A boundary item may become active in any suitable way and, in some embodiments, may become active when a user starts to navigate text in a different direction from a current direction of navigation in the text. A user may be navigating text from left to right and may then choose to navigate text from right to left (or vice versa) such that a boundary item located at or near the point in the text at which the user changed the direction of navigation may become active. In such instances, a user may insert text after indicate a change in the direction of navigation, but before starting to navigate in the opposite direction.

When a display is provided, the boundary item may be presented visually to a user. To this end, the boundary item may be presented as a space, a cursor, a thin hairline cursor (e.g., between two characters), or any other suitable special character or symbol for separating two portions of text that becomes visually highlighted when active. As with other special items, the visual highlighting may be achieved by using shading, a different font, underlining, highlight box, reverse highlighting, blinking, or any other suitable technique for highlighting. Additionally or alternatively, a boundary item may be presented audibly to a user. This may be done in any suitable way. For example, a boundary item corresponding to the boundary between "text item A" and "text item B" may be played back by having the TTS engine state "after text item A" or "before text item B," depending on whether "text item A" or "text item B" was the last active item, or by having the TTS engine otherwise indicate that a boundary item is active.

As previously mentioned, a user may input commands to the system while using the system to input, navigate and/or edit text. Examples of such commands include, but are not limited to, actions such as "delete," "replace by [next/previous alternate]," "capitalize," and "to upper/lower case." A user may input such commands in any suitable way such as by speaking them as voice commands, pressing a button, turning a rotary knob, etc. The effect of a command may depend on whether the user inputs the command while a boundary item is active, or while text is active. In the case when a boundary item is active, the command may apply to the text item (e.g., chunk, word, character, etc.) that was last active before the boundary item became active. The system may provide the user with visual and/or auditory prompts to make the user aware of which text item would be affected by a command input by the user while a boundary item is active. Though, in some instances, the command may have an effect on the boundary item itself. For instance, a "delete" command may remove the active boundary item (e.g., a space between two words) between two text items, thereby effectively concatenating the two text items (e.g., two words) into one text item (e.g., one word). In some embodiments, one or multiple commands may be disabled while a boundary item is active.

The inventors have appreciated that because a user may dictate text as well as provide voice commands, the system may need to be capable of identifying whether input provided by the user is a command or dictated text. It is possible to incorrectly identify a command as dictated text and vice versa (e.g., a user may wish to dictate "remind me to send a message to Irene" and the system may incorrectly identify the latter portion of the dictated text as a command instructing a message to be sent to Irene). Conventional approaches to reducing incorrect identification of commands as dictated text and vice versa include a user providing input to the system (e.g., by pushing a button or in any other suitable way) that indicates whether the user's subsequent speech corresponds to a command to the system or dictation to be converted to text. However, the inventors have appreciated that removing such additional control mechanisms (e.g., a button to switch between command and dictation modes) may facilitate a design that is more appealing to a user.

Accordingly, in some embodiments, the system may be configured to recognize only a subset of all possible commands to reduce instances in which voice commands are incorrectly identified as dictated text and vice versa. Recognizing only a subset of commands reduces the number of commands the system has to recognize as commands and, as such, reduces errors resulting from incorrectly identifying commands as dictated text and vice versa.

The subset of voice commands recognized by the system as commands may differ depending on circumstances such as how the system is being used (e.g., what mode the system is operating in) and who is using the system (e.g., a novice or an experienced user). For example, voice commands not frequently used by a user may not be in the subset of voice commands recognized by the system. As a specific non-limiting example, when the system is being used by an inexperienced user, voice commands for requesting the system to spell out a portion of text (e.g., "spell it", "spell <text item>") may not be in the subset of voice commands recognized by the system. As another example, when the system is in the above-described "replace/insert" editing mode, voice commands such as "replace (active text) by <new text>" and "insert <new text> (before or after the active text)" may not be in the subset of voice commands recognized by the system. As yet another example, commands that can be achieve using other user actions (e.g., pushing a button, turning a rotary knob, etc.) may be disabled as voiced commands. For instance, when the user interface includes a delete button the "delete" voice command may not be in the subset of voice commands recognized by the system. However, in some embodiments, voice commands that are redundant of other mechanisms may be part of or remain in the command vocabulary.

By way of further illustration, one exemplary subset of voice commands that may be recognized by the system is shown in Table 1 below. The first column in each row of the table lists a function that may be performed by the system in response to one or more commands listed in the second column of the row.

TABLE 1

Illustrative Voice Commands and Associated Functions

| | Sample Voice Commands |
|---|---|
| Editing & navigation functions | |
| Help | Help, What can I say. |
| Read whole message | Read the whole message. |
| Cancel the whole message | Cancel/Clear/Delete the whole message. |
| Correct with automatic location of what to correct | I said/I meant/Correct to <correct phrase> |
| Correct X to Y | Correct/Replace <wrong phrase> to/by <correct phrase> |
| Indicate spelled input | Spelling E C O R |
| Chunk mode | Multiword mode/Chunk mode |
| Word mode | Word mode |
| Spelling mode | Spell mode/Spelling mode/Letter mode/Character mode |
| Convert to lower case | (Convert) to lower case |
| Convert to upper case | (Convert) to upper case |
| Capitalize | (Convert) to capitals/Capitalize |
| Undo | Undo the last command/editing/edit operation |
| Messaging related functions | |
| Send | Send the message, Send it. |
| Send to <contact> | Send the message to <contact>, Send to <contact>. |
| Read newest incoming message | Read incoming message(s). |
| Read incoming message from contact | Read incoming message from <contact>. |
| Show newest incoming message | Show incoming message(s). |
| Show incoming message from contact | Show incoming message from <contact>. |
| Mark all incoming messages read | Mark [all] incoming messages [as] read. |
| Respond to an incoming message | Respond, Reply |

The inventors have appreciated that correction may be facilitated in some instances by having the system assist the user in correction, for example, by providing suggested corrections to a segment of text (e.g., a chunk or word). In some embodiments, each text segment may be associated with a list of alternate candidates from the recognition engine (e.g., the n-best list from an ASR engine), used to recognize the text segment.

Figure 6:
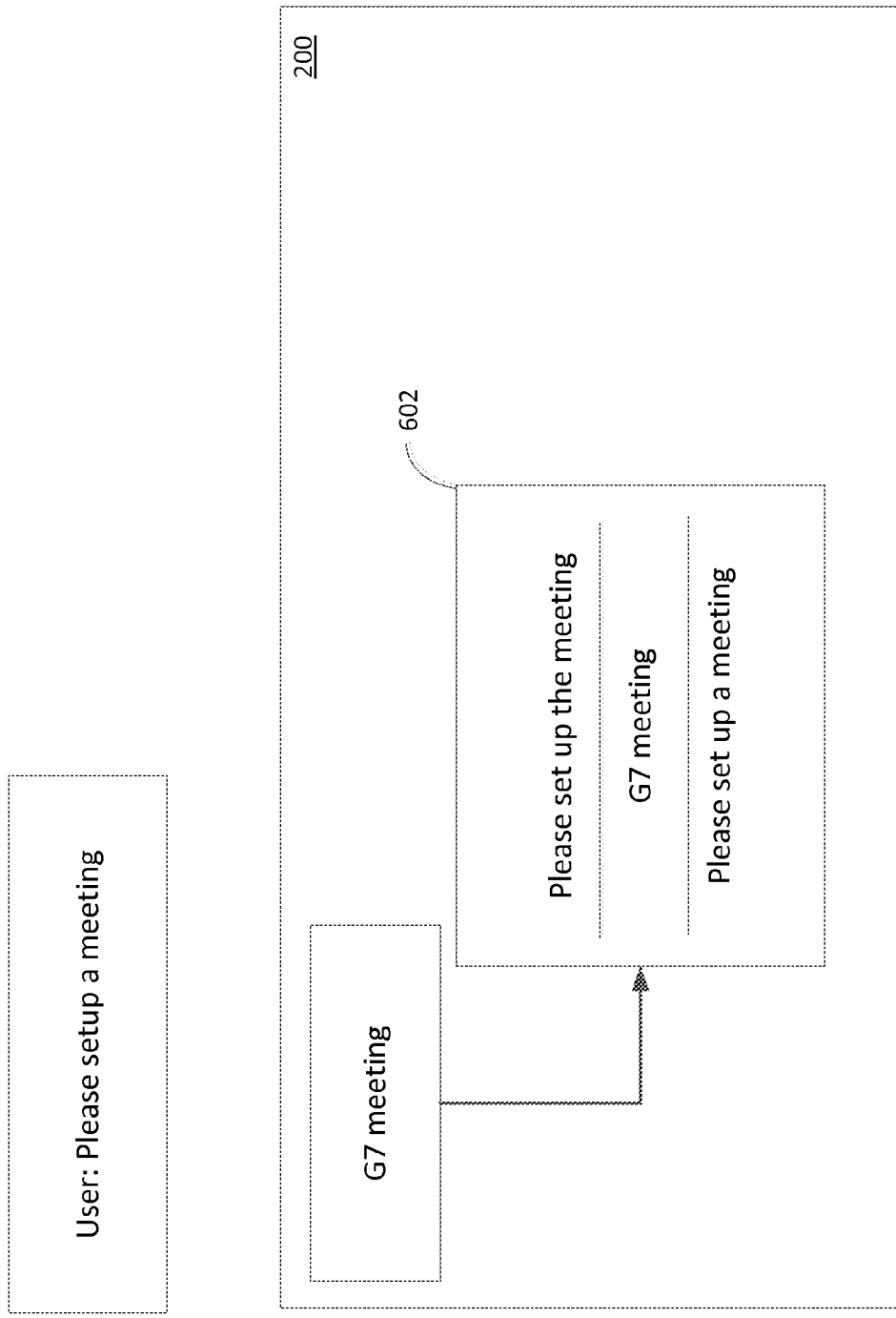
FIG. 6 illustrates a system providing correction suggestions to a user, in accordance with some embodiments.

FIG. 6 illustrates an example of editing a text chunk with assistance from the system. In this example, a user dictates, or otherwise enters, the text chunk "Please setup a meeting," which is erroneously recognized as "G7 meeting." However, the recognition engine also stores a list of alternate phrases associated with "G7 meeting," which are shown on list 602. The user may select one of the phrases in list 602 and replace the active chunk (or in other examples only a part of the active chunk) with the selected phrase. While the list of alternate phrases consists of three entries in this example, the number of entries in such a list may be any number. For example, the list of alternate phrases could be the so-called n-best list generated by an ASR engine(s). The list of alternate phrases may also be generated from previous misrecognitions, as discussed in further detail below.

In the example of FIG. 6, the list of alternate text items is shown on display screen 200. Though, in some embodiments, the items in the list of alternate text items (e.g., chunks, phrases, words, characters, etc.) need not be shown in addition to the text in the active chunk. Instead, the user may simply replace the text in the active chunk by an alternate text item selected from the list of alternate text items (e.g., an n-best list generated by an ASR engine(s)). This may be done in any suitable way.

In some embodiments, the list of alternate text items may be organized such that each item in the list is associated with two neighbors referred to as the "next" item and the "previous" item. For example, when the list of alternate text items is an n-best list, the second-best item has two neighbors: the best item and the third best item, corresponding to the previous neighbor and next neighbor of the second-best item, respectively. Accordingly, the user may replace the text in the active chunk by a neighbor of that text in the list of alternate text items. To this end, the user may provide input indicating that text in the active chunk should be replaced with either the previous text item or with the next text item in the list of alternative text items. The user may provide such input using any suitable mechanism such by using one or more buttons (e.g., a pair of next/previous buttons, a short or long press of a single button), a rotary knob, speech, or any suitable combination thereof.

In addition to or instead of being visually presented, items in the list of alternate text items (e.g., list 602) may be audibly presented. For example, when text in the active chunk is replaced by an alternate text item selected from the list of alternate text items (e.g., after the user pushes a button or rotates a rotary knob), the system may be configured to audibly present the selected text item. Generally, a user may browse through items in the list of alternate text items just as he may browse through a set of chunks, with each text item in the list being audibly presented using a TTS engine. The user may select to hear all the alternate text items, listen to each text item one at a time, or listen to the one or more alternative text items in any suitable order.

It should be appreciated that entering, navigating or proofing text in chunk mode is only one exemplary technique for text entry and proofing. The inventors have recognized that allowing a user to proof, navigate and/or edit text on smaller units than chunks may facilitate more flexible text entry and proofing. According to some embodiments, a data-system may operate in a word mode or a character mode in which entered text can be navigated and/or corrected on a word-by-word basis or a character-by-character basis, respectively. Some embodiments include allowing the user to select whether to operate in chunk mode, word mode or character mode. However, each mode need not be available or implemented, as the aspects are not limited in this respect. The inventors have recognized that switching into a mode different from chunk mode may, in some circumstances, simplify navigating and/or editing previously-entered text.

Figure 7A:
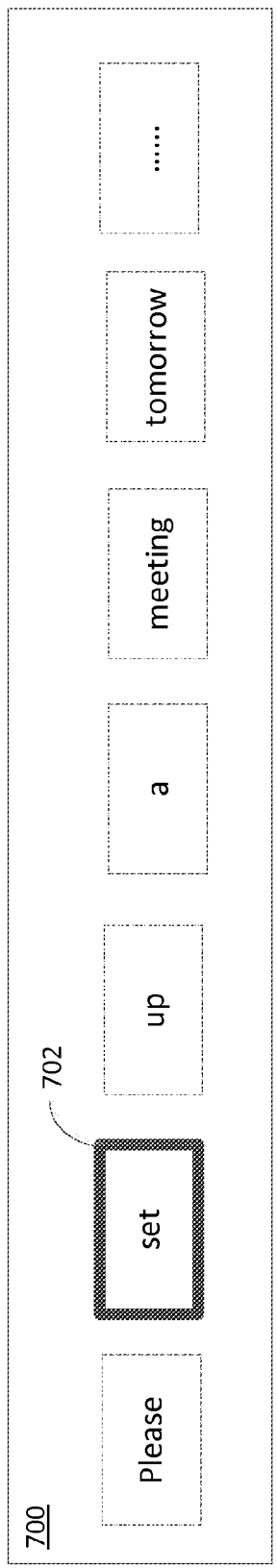
FIGS. 7A and 7B illustrate a word mode and a character mode, respectively, in accordance with some embodiments.

FIG. 7A illustrates a word-mode presentation of text entered into a data-entry system. Word-mode may be useful when a user wants to delete or replace single words or when a user requests that a single word be spelled out. FIG. 7A illustrates word-mode navigating of the entered text "Please set up a meeting tomorrow." Word 702 ("set") is designated as the active word as shown on screen 700. The active word in word-mode may be visually emphasized just as the active chunk may be visually emphasized in chunk-mode, and the active word may be emphasized by using any suitable technique such as shading, altering font type and size, and underlining, etc. In some instances, in word mode, a word may be displayed in the same way as the corresponding text chunk.

In FIG. 7A, to denote some form of emphasis, the active word is emphasized using a box with a solid line, while other words are displayed using boxes with dashed lines. As a user navigates through text in word mode (e.g., by using voice commands or manual mechanisms such as button presses, arrow keys, etc.), the text of any word that becomes active during browsing may be visually highlighted (e.g., by highlighting its background or by underlining it) and/or be played back to a user using TTS synthesis and audio rendering. New text may be added/edited in word mode in a manner analogous to how new text may be added/edited in chunk mode.

Figure 7B:
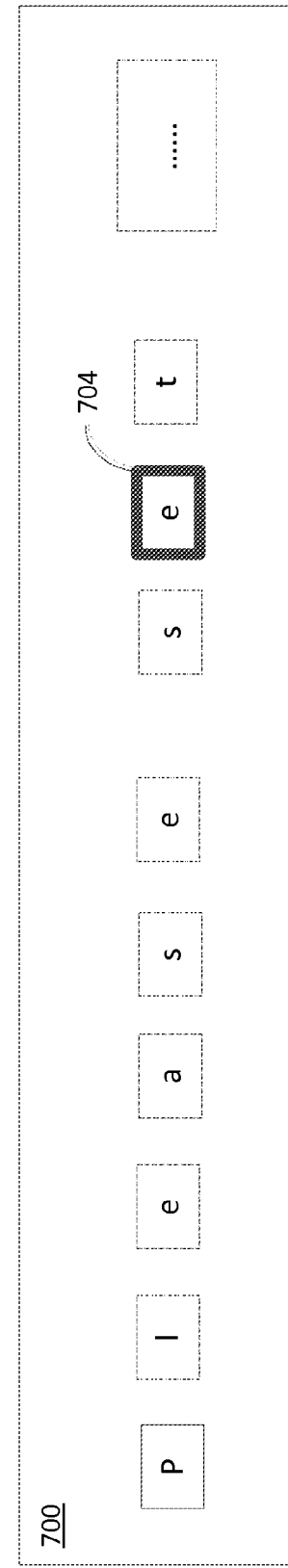

In some instances it may be convenient to navigate and/or edit in a character mode. Character mode may operate in a manner similar to chunk or word mode except that the unit for navigation/editing is at the character level. Character mode may be convenient in circumstances when data is to be entered or corrections made by spelling words, as discussed in further detail below. FIG. 7B illustrates a character-mode presentation of the text "Please set." In this mode, individual characters such as letters and spaces may be presented to the user audibly and/or visually, with an active character designated. The behavior of the active character may be analogous in many ways to that of an active word in word mode or an active chunk in chunk mode. For example, an active character may be audibly presented by TTS synthesis when it becomes active, it may be visually highlighted, and/or it may be operated on using any appropriate editing operation described herein. TTS synthesis may be used to synthesize any suitable character including a space character and any punctuation character such that the space character is synthesized as the utterance "space," the character "," is synthesized as the utterance "comma," and etc.

In some embodiments, character mode allows a user to navigate and/or edit text on a character-by-character basis. In some embodiments, character mode also allows a user to enter data on a character basis. For example, a user may enter data via speech in character mode by spelling the words to be entered. When a user provides input in character mode, the recognized letters may be inserted after the active character (e.g., in an insert mode) or may replace the active character (e.g., in a replace/insert mode, or when voice commands indicate that replacement is desired). Spelling words or other text to be entered may be beneficial where the word to be entered is not a standard word likely to be recognized by an ASR engine or is not a dictionary recognized word at all (e.g., an acronym or some other slang or jargon). Similarly, editing in character mode may be convenient to correct words misrecognized by the ASR engine that are not likely to be correctly recognized if spoken again and/or that have been repeatedly mis-recognized.

It should be appreciated that any one or combination of modes may be provided. In circumstances in which multiple modes are provided, the user may choose which mode to operate in and switch between modes using any selection mechanism such as by issuing a voice command, pressing a button to select a specific mode and/or to toggle between modes, or activating any other type of selection mechanism to operate in a desired mode.

As described above, active text may be played back using TTS (e.g., a TTS engine) when it receives focus, for example, when text is first entered by the user or when the user indicates that some portion of the text or the whole text is to be played (e.g., in response to commands like "Play entire text"). Audio playback via TTS may be synchronized with the emphasized display of the active text or items to assist the user in understanding what text is being audibly rendered to facilitate review and/or editing. Synchronizing audio playback with visual emphasis (e.g., highlighting) refers to a prescribed correspondence between the audio playback and the visual emphasis of text and does not require simultaneity (e.g., there may be a lag, as discussed in further detail below) between subject matter being audibly rendered and visually emphasized, though simultaneous synchronization is one possible option for implementing synchronous playback.

The inventors have appreciated that TTS playback may be synchronized with the display of the active text using different techniques depending on whether the user is operating in chunk, word or character mode, as discussed in further detail below. However, it should be appreciated that TTS playback may also be synchronized in the same manner for each mode, as the aspects are not limited in this respect. Some TTS systems are capable of providing information about when each word starts and ends in the synthesized audio. This information may be used to synchronized audio playback and visual emphasis of text using any of the techniques described herein, as discussed in further detail below.

According to some embodiments, when operating in word mode, the active word may be automatically shifted (e.g., the emphasis on the display may be changed) to match the word currently being played by the TTS engine. This may be advantageous because when the user hears a possible error in the audio output being played, the user can quickly check the display to either confirm or identify an error and/or perform some action that stops the audio playback, resulting in the target word that triggered the action (or its close neighbor) being active. Also, highlighting the word currently being played back as active may help the user spot errors in its spelling. According to some embodiments, a lag may be implemented between the audio playback and the visual emphasis to account for user response times. This may increase the likelihood that, when a user checks the display and/or a user performs some action to stop the playback, the currently active word being emphasized is the word that triggered the check and/or triggered the user to perform the action. Such a lag may be of any desired time (including no lag as discussed above), may have a default value, may be capable of being turned off and on, and/or may be user configurable.

According to some embodiments, pauses may be inserted between the words being synthesized by the TTS so that each word remains active for a desired amount of time, especially when playing back longer pieces of texts. For example, a pause of 100 ms may be inserted between each word being synthesized. However, pauses of any duration may be inserted to provide a playback to improve user chances of identifying erroneous recognitions. This may be particularly effective in instances where the misrecognition is phonetically similar to what the user actually spoke (e.g., a recognition of "back up four inches" when the correct sentence should have been "bag of oranges"). The length of pauses inserted between words may also be user configurable so that the pauses can be set to suit a particular user.

According to some embodiments, when operating in chunk mode, the active chunk may be emphasized synchronously with the audio playback of the active chunk. Word-level emphasis may also be used to emphasize words within a chunk synchronously with the audio playback using any of the techniques described above in connection with word mode audio playback. For example, two different styles of emphasis may be used during audio playback in chunk mode. A first emphasis may be used to emphasize the active chunk being rendered audibly and a second emphasis may be used to synchronously emphasize words within the chunk as they are being audibly rendered during playback (e.g., the active chunk may be highlighted with a particular color or have a highlighted background and the word being playback via TTS may be synchronously emphasized using underline). Any two different styles of highlighting may be used in this respect to synchronize both the emphasis of the chunk being audibly played back and the words within the chunk, as the aspects are not limited in this respect.

In some embodiments, when audio playback occurs during chunk mode, the system may temporarily enter word mode for audio playback. Any of the techniques described above in connection with word-level audio playback may then be used to synchronize the audio playback with word-level emphasis to facilitate the review and/or editing process. In such embodiments, the same techniques implemented for word mode audio playback may be used for chunk mode audio playback and the system need only temporarily switch itself to word mode to perform audio playback and specialized chunk mode audio playback functionality may be unnecessary. According to some embodiments, the system may revert to chunk mode upon completion of the audio playback. In other embodiments, the system may remain in word mode to allow the user to navigate the text in word mode to correct any errors that were detected and return to chunk mode when/if the user resumes dictating.

When operating in character mode, audio playback may be implemented by having TTS spell the text one character at a time. To synchronize the audio playback with the display emphasis, each character may become active and emphasized as the character is audibly rendered by TTS (or with some desired lag as discussed above). Pauses between characters may also be used to slow down the spelling of the text during audio playback. Such pauses may have some default value, and/or may be selectable or user configurable. In addition, audio playback using pauses may be toggled on and off to allow a user to operate with or without pauses and provide the capability for the user to select the duration of the pause.

In some embodiments, when the system performs audio playback in character mode, or the user has otherwise indicated that audio playback should audibly render characters in the text individually (e.g., by using a command to instruct the system to "spell it out"), both the word being spelled and the character being audibly rendered may be emphasized using two different styles of emphasis such that the user can focus on the word and specific character being rendered relatively quickly and easily. For example, a first highlighting technique may be used to emphasize the word containing the active character to help the user focus at the word level, and a second highlighting technique (e.g., a bounding box) may be used to emphasize the character being spoken audibly via TTS playback to help the user focus on the specific character. Alternately, just the character being spoken via TTS may be emphasized on the display.

It should be appreciated that character-by-character playback (e.g., a spell mode for audio playback) may be used when the system is in chunk mode, word mode or character mode, as techniques for audibly rendering characters in a text are not limited to any particular mode of operation. For example, the system may enter a spell mode for audio playback and resume operation in a different mode (e.g., the system may revert to chunk mode or word mode) when the audio playback is finished. In embodiments wherein a temporary mode wherein audio playback is performed on a character-by-character basis is entered, the system may resume operation in a different mode upon completing the audio playback, or may resume operation when the user resumes dictating such that character mode review and/or correction may be performed.

When audio playback is completed, how the system treats subsequent user input may depend on where in a text the audio playback ended and/or where the previously active text or item is/was located and/or whether the system is operating in insert or replace/insert mode. In some embodiments, the system will automatically determine whether to be in insert or replace/insert mode depending on where the current active text or item is located in the text. For example, the system may determine whether the user will most likely want to insert text or replace text next based on whether the user is at the beginning, somewhere within, or at the end of the text. The system may also use the location and/or mode to determine which text to make active and/or whether to make text or an item (e.g., a boundary item, beginning-of-text item, end-of-text item, etc.) active.

As previously described, a system in accordance with embodiments described herein may provide one or multiple modes for entering, navigating, and/or editing text such as chunk mode, word mode, character mode, and spell mode. In some embodiments, a user may change the mode of the system by pressing a button (e.g., a button to toggle between modes), providing a voice command to directly set the desired mode, or in any other suitable way. Each change of a navigation mode may be accompanied by a visual and/or an auditory confirmation of the mode change being presented to the user. A visual confirmation may comprise a different text unit becoming active and being highlighted accordingly (e.g., a change from word mode to a chunk mode may be visually confirmed by an active chunk being visually highlighted rather than an active word being visually highlighted). An auditory confirmation may comprise the system outputting an auditory announcement of the mode change (e.g., playing back "chunk mode" after switching into chunk mode from another mode). An auditory confirmation may further comprise the system playing back the new active text item (e.g., "please setup a meeting" after switching into chunk mode from another mode). An announcement of a mode change and audio play back of the new active item may be used along, or may be used in combination for example by rendering them consecutively without or without a pause in between (e.g., the system may say "chunk mode." [1 sec. pause] "please setup a meeting").

The inventors have recognized that, in certain situations, using one of the modes of operation may be more convenient that using the other modes. However, it may be inconvenient for users to manually provide input to switch among the modes, or the user may not be aware that another mode may be more convenient. Accordingly, in some embodiments, the system may automatically change the mode of operation from one mode to another. This may occur in any of numerous situations including, but not limited to, situations described in further detail below. In some embodiments having multiple modes, automatic switching by the system (when implemented) may be disabled by the user if desired so that the system only changes modes in response to user input instructing the system to do so. Some examples of automatic mode switching by the system is described in further detail below.

After new text is entered, the system may automatically change its mode of operation to chunk mode, regardless of the mode the system was previously in, so that the newly entered text chunk becomes the active chunk. Changing the mode of operation to chunk mode after new text is entered may be advantageous because a user may wish to input one or more commands to be applied to the entire newly entered chunk. For example, the user may wish to delete the new chunk or find an alternative recognition of the chunk (e.g., by replacing the text in the active chunk by an alternate text item selected from an n-best list of alternate recognitions).

In some embodiments, after new text is entered, the system may change its mode of operation to chunk mode only temporarily; in this case the system is said to enter a "temporary chunk mode." The system may change its mode from temporary chunk mode back to its last mode of operation and/or a default mode of operation (when one mode is identified as a default mode) based on some event or user input. The system may return to a previous and/or default mode of operation after a user performs one or more predetermined actions including, but not limited to, navigating text to the left (e.g., focusing on the last word of the newly entered text) or to the right (e.g., cycling to the beginning-of-text item), deleting the dictated chunk, and/or replacing the dictated chunk with an alternate text chunk. Though, it should be recognized that, in some instances, the system may continue to operate in chunk mode, for example, during fast navigation, as described in greater detail below.

In some embodiments, the system may automatically switch among modes of operation in response to an indication from a user that the user seeks to navigate the recognized text more quickly. The system may automatically switch from character mode to word mode or chunk mode and/or from word mode to chunk mode in order to enable the user to navigate the recognized text more quickly. Conversely, the system may automatically switch from chunk mode to word mode or character mode and/or from word mode to character mode in order to enable the user to navigate the recognized text more slowly. It should also be appreciated that when the system is in spell mode (e.g., after a user placed the system into spell mode or the system automatically entered to spell mode), the system may automatically switch into word or chunk mode in response to an indication from the user that the user would like to navigate text more quickly.

The user may provide an indication to the system that he wishes to navigate more quickly or more slowly in any of numerous ways. In particular, the user may provide such indications by pressing one or more buttons for different periods of time or by rotating a rotary knob at different speeds. For example, to indicate that the user wishes to navigate text more quickly, the user may hold down a button (e.g., a button for moving to the next text item, a button for moving to the previous text item, etc.) for a longer period of time than may be needed to press the button for normal-speed navigation. As another example, the user may turn a rotary knob quickly over a greater range of degrees than may be needed for normal-speed navigation to indicate that he wishes to navigate text more quickly. On the other hand, the user may indicate that he wishes to navigate text more slowly by pressing one or more buttons for a short period of time or by rotating a rotary knob at normal browsing speed instead of rotating the knob rapidly.

The inventors have appreciated that when the system automatically switches from one mode to another mode (e.g., from word mode to chunk mode and vice versa) that there may be more than one way to set the active item in the new mode. For example, when switching from word mode to chunk mode, the active chunk may be set as the chunk containing the active word, as the chunk preceding the chunk containing the active word, or as the chunk following the chunk containing the active word. Similarly, there may be options for selecting the active word when switching into word mode (from any other mode), for selecting the active character when switching into character mode (from any other mode) and so on.

Some of the possible options for how to set an active word when switching into word mode from chunk mode and how to set an active chunk when switching into chunk mode from word mode are illustrated in Table 2 below. Though, it should be recognized that the examples in Table 2 are merely illustrative, as an active item may be set in any other suitable way, after the system switches to a new mode of operation, based on any other suitable criterion or criteria.

TABLE 2

| Mode change | Navigation direction | Text item or items that may become active |
|---|---|---|
| Fast navigation: Word Mode → Chunk Mode | Right-to-Left | 1. The chunk containing the so far active word<br>2. The chunk preceding the chunk containing the so far active word. |
| | Left-to-Right | 1. The chunk containing the so far active word<br>2. The chunk following the chunk containing the so far active word. |
| Slow navigation: Chunk Mode → Word Mode | Right-to-Left | 1. The last word of the chunk preceding the so far active chunk.<br>2. The last word of the so far active chunk. |
| | Left-to-Right | 1. The first word of the so far active chunk.<br>2. The first word of the chunk following the so far active chunk. |

In some embodiments, the system may automatically switch modes of operation after recognized text is cleared. After recognized text is cleared the system may automatically switch to a predetermined mode of operation, which may be either spell mode, character mode, word mode, or chunk mode. In preferred embodiments, the system may automatically switch into word or chunk mode after text is cleared. Recognized text may be cleared in a number of different circumstances. For example, text may be cleared after a user has sent out a message containing text dictated by the user. As another example, text may be cleared if the user deletes all the entered text. When a display is available and is used for visually presenting recognized text, clearing of recognized text may correspond to clearing of the text shown in the display. Though, it should be recognized that text may be cleared in other circumstances, as aspects of the present invention are not limited in this respect.

In some embodiments, the system may automatically change its mode of operation into spell mode or character mode. The system may be configured to do so when it is determined that character-level editing (e.g., adding a missing character, deleting a character, replacing a character, etc.) of entered text is needed. In some instances, it may be easier for a user to edit one or more characters than to browse through alternative recognitions in an n-best list (e.g., when editing a word in word mode) or re-dictate a portion of the text. The determination that character-level editing should be entered may be made in any suitable way and, for example, may be made automatically or based on one or more inputs from a user.

As discussed above, the inventors have recognized that detecting errors in entered text may sometimes be difficult when listening to an audio playback of the entered text, particularly when the text includes portions that have acoustically-similar counterparts. For example, the presence of homophones in a text may make it difficult for the listener to ascertain which amongst a plurality of homophones is actually in the text and being played back via audio.

As used herein, a homophone is one of two or more words that are acoustically-similar but have different spellings (strictly speaking, homophones also include acoustically-similar words that are spelled the same but have different meanings, but such homophones are not problematic in the context of text proofing since they share the same spelling). The English language includes numerous homophones that are pronounced the same or similarly, but that are spelled differently. Examples of such homophones include: "buy", "by" and "bye;" "bare" and "bear;" "rain" and "reign;" and "C," "see," and "sea," to name but a few.

Multiple words or phrases may also be acoustically similar and thus give rise to ambiguity when pronounced (e.g., via audio playback). For example, multiple words such as "at ten" may sound confusingly similar to the word "attend," or the phrase "kiss the sky" may sound confusingly similar to the phrase "kiss this guy," when pronounced and therefore may complicate detecting errors in text via audio playback (e.g., because the listener may not be able to readily ascertain which spelling of the acoustically similar word or phrase is the one present in the text being audibly rendered).

The quality of the synthesized voice used by a data-entry system for audio playback may also influence the perceived acoustic similarity of words and/or phrases, and may introduce further acoustic ambiguity. Likewise, noise in the environment of the user may influence a listener's ability to understand correctly the audio output and may impair the ability of conventional ASR techniques to recognize acoustic input. In some cases, the introduction of noise may make a pair of words and/or phrases more acoustically similar than they are in a noise-free environment.

Additionally, that a listener often expects to hear just what the user said during audio playback may make a user even less adept at detecting that one or more words spoken by the user were in fact incorrectly converted to an acoustically similar word or phrase in the text. The dialect or accent of some users may also give rise to additional ambiguity with words that may not be problematic with a user articulating using more "standard" speech. For example, the words "are" and "our" may sound similar spoken with some accents and quite distinct when spoken with others. Accordingly, acoustically ambiguous words or phrases may arise from any number of sources to negatively impact a listener's ability to proof text via audio playback, rendering techniques to address these problems advantageous.

The inventors have appreciated that methods for assisting a user in ascertaining which word or phrase, amongst a plurality of acoustically similar possibilities, is the one present in an entered text may facilitate improved proofing of the text. Some embodiments include introducing cues in an audio playback to assist the user in ascertaining which acoustically similar word or phrase is represented in the text so that the user can determine whether the text correctly corresponds with what the user intended (e.g., whether the text accurately reflects what the user spoke).

Methods for disambiguating acoustically similar words or phrases may be used, for example, in any of the data-entry systems described herein (e.g., the data entry systems described in connection with FIGS. 1A and 1B), or may be used in other types of systems where it may be useful to assist a listener in correctly ascertaining the content of a text. For example, presentation component 130 or audio presentation component 135 in FIGS. 1A and 1B, respectively, may implement one or more methods described herein for disambiguating acoustically similar text.

Figure 8:
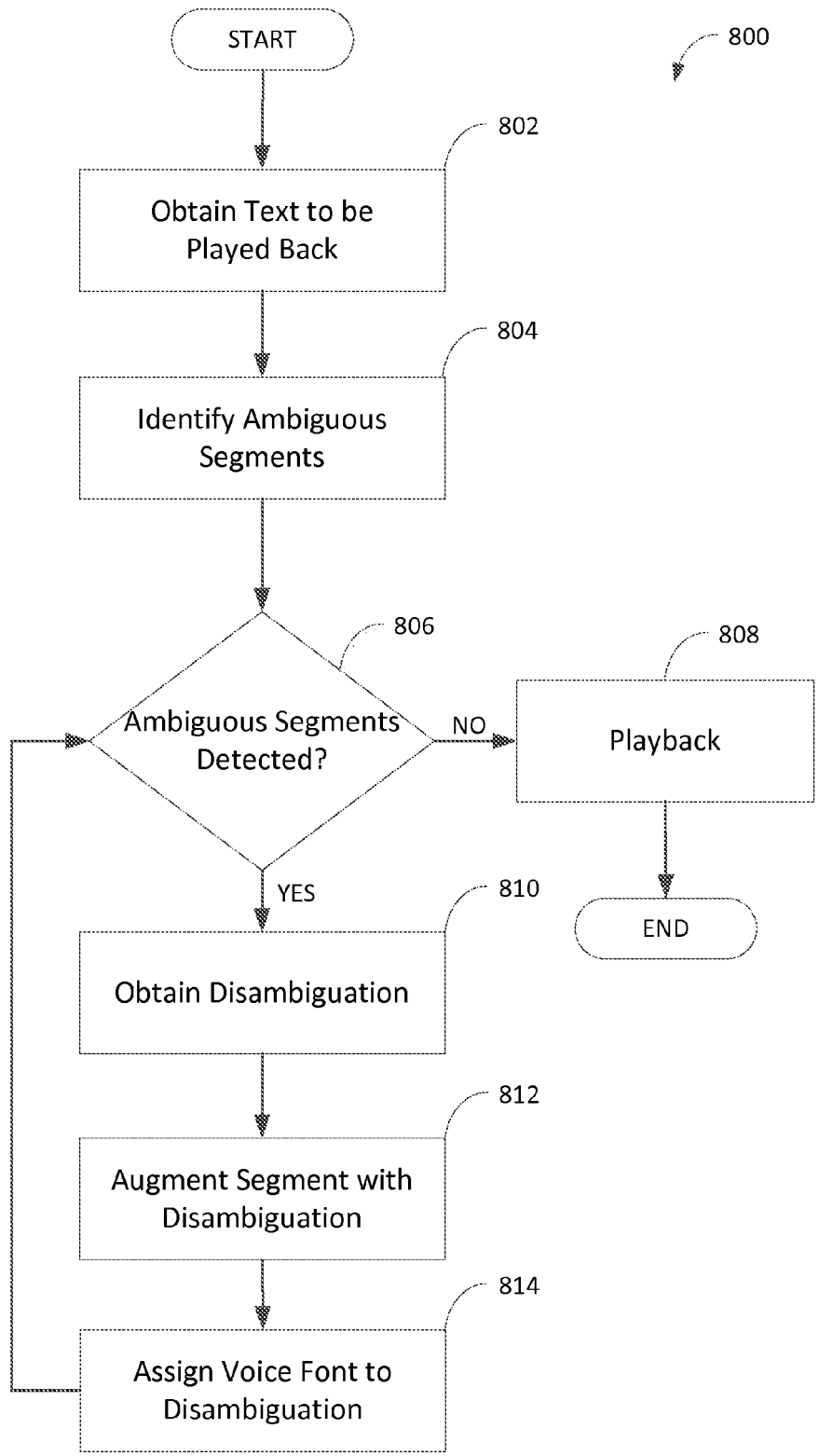
FIG. 8 shows a flowchart of a method of disambiguating potentially ambiguous text in an audio presentation, in accordance with some embodiments.

FIG. 8 is a flowchart showing a process 800 for facilitating disambiguating acoustically similar words or phrases according to some embodiments. In act 802, the text to be audibly rendered (e.g., played back as audio over one or more speakers) is obtained. The text to be played back may be any text input into a data-entry system and may have been obtained in any of numerous ways (e.g., the text may have been converted from a user's speech). In some embodiments, text may have been entered, at least in part, via a keypad, keyboard or touchscreen, using a mouse or other pointing device, may be obtained from a memory, downloaded remotely, wirelessly transmitted to the system or otherwise provided to the system (e.g., via one or more other alternative methods including using handwriting recognition and/or optical character recognition).

Any portion of text or the text in its entirety may be selected for audio playback. For instance, if a user is navigating text in specified units (e.g., chunks, words, characters) then the portion of the text to be played back may correspond to one or more such units (e.g., the active unit and/or one or more subsequent units). However, the portion of the text selected for audio play-back may comprise any part and/or the entirety of the text.

In act 804, ambiguous text segments (i.e., text segments that are acoustically similar to other words or phrases, such as homophones or other acoustically similar words or phrases are identified in the portion of the text to be audibly rendered. Any of numerous approaches may be used to identify such text segments. In some embodiments, a list of homophone groups may be used. A homophone group may comprise all mutually confusable homophones. For instance, the homophones "by," "bye," and "buy" may all be part of a homophone group. When a list of homophone groups is available, the list may be searched to determine whether any text selected for play-back is listed as a homophone. Similarly, a list of acoustically similar words or phrases that are not strictly homophones may also be provided and searched to determine whether the text to be audibly rendered contains any acoustically ambiguous portions that may be pointed out to the listener via techniques described herein.

A list of acoustically similar words or phrases may be obtained manually (e.g., constructed by hand, downloaded from a repository or otherwise obtained from an available resource) or by automatic methods, for example, based at least in part on measuring a distance between pronunciations using a suitable acoustic similarity measure (e.g., a weighted edit distance over phonemes). An edit distance over phonemic representations of two text segments may be used to quantify the acoustic similarity between them. Additionally or alternatively, a weighted edit distance over phonemic representations of the two text segments may be used. Other methods of measuring acoustic similarity (e.g., by using cepstral distance) may be used, as the aspects are not limited in this respect.

Acoustically ambiguous text segments may also be identified by using speech recognition technology. For instance, when a user dictates text to a data-entry system, an N-best list of words/phrases may be obtained for each recognized word/phrase. The N-best list represents the most likely candidates for the word/phrase. An acoustic similarity may then be computed between each recognized word/phrase and every word/phrase in the N-best list corresponding to the recognized word/phrase. These computed acoustic similarities may indicate the degree to which certain pairs of words/phrases are acoustically similar and may cause confusion.

As an example, a first word/phrase and a second word/phrase in the N-best list corresponding to the first word/phrase may be identified as acoustically similar if their acoustic similarity exceeds a threshold (e.g., as indicated by their relative confidence values), which may be set either manually or automatically. If any recognized word/phrase is identified as having at least one acoustically-similar word/phrase in its N-best list, then the recognized word/phrase may be flagged as potentially ambiguous and the following disambiguation techniques may be applied. In some embodiments, confidence scores from recognition may be used to identify potentially ambiguous words. For example, if two words both have relatively high confidence scores, they may be acoustically similar.

It should be appreciated that the above described techniques for identifying potential ambiguous words or phrases may be applied to a text segment of any suitable length (e.g., multiple characters, words, multiple words, phrases, and/or sentences). Other techniques may be used, or various techniques may be used together to identify text for which one or more disambiguation techniques may be applied.

In act 806, it is determined if any ambiguous text was identified (i.e., whether any acoustically ambiguous words or phrases were detected in the text for which disambiguation is desired). If no ambiguous text segments were identified, then the text selected for audio rendering may be converted to audio, e.g., using a TTS engine in the usual manner (see act 808) to produce an audio presentation. The audio presentation may then be audibly rendered to the user.

If at least one ambiguous text segment is identified in act 804, then one or more disambiguation techniques may be applied (see act 810). In some embodiments, disambiguation is performed by annotating the text with an explanation that assists a listener in ascertaining which of acoustically similar text words or phrases is represented in the text. For example, if the word "bear" is identified in the text as being acoustically ambiguous, the text to be played back may be annotated with the text "bear as in the animal" to distinguish the word from its homophone "bare."

Another disambiguation technique for disambiguation may include spelling the word or phrase identified as being acoustically ambiguous. In the above example, the word "bear" may be annotated with the text "spelled as B E A R," where the word is audibly spelled to the listener. Spelling may provide a general solution to disambiguation as it may be applied, at least in part, automatically to any word or phrase identified as being acoustically ambiguous. Other disambiguation techniques may require more manual involvement to specify the annotation corresponding to any given word or phrase identified as potentially ambiguous. Other methods of providing disambiguating information to a text may be used, as the aspects of the invention are not limited in this respect.

Annotating a text may include inserting the disambiguating information directly into the text. As such, when the text is converted to an audio presentation (e.g., a speech signal), for example, by performing TTS on the text, the disambiguating information will be converted to audio in the same manner and during the same process as the rest of the text. For example, the sentence "The national park has a grizzly bear" may be annotated by changing the text to "The national park has a grizzly bear, as in B E A R" or "The national park has a grizzly bear, as in the animal." Thus, when the annotated text is converted to audio via TTS, the disambiguation will be audibly rendered as if it were part of the text itself. Text insertion may be performed in any suitable way. Though in the above example, the disambiguating information is appended at an end of the segment identified as ambiguous, disambiguating text may be inserted anywhere that alerts the user to the ambiguous text (e.g., anywhere proximate the ambiguous text).

Annotating a text may be performed in other ways besides inserting disambiguating information into the text. For example, disambiguating information may be stored as prerecorded utterances that are retrieved when a corresponding ambiguous word or phrase is identified. The prerecorded utterance may then be inserted or spliced into the audio signal representing the text (e.g., the audio signal generated by performing TTS on the text). Accordingly, when the resulting audio is rendered, the prerecorded utterances will be played at the appropriate times during audio play back. Using this technique, the text may be annotated with a reference (e.g., a mark-up, tag or link to an audio file or other prerecorded utterance stored locally or remotely over a network) to a prerecorded utterance that gets inserted into the audio signal to be played back to the user. The prerecorded utterance may be any type of disambiguating information such as a recording of the definition, meaning, spelling, or other contextual information associated with the ambiguous word or phrase.

Optionally, disambiguating information may be assigned a distinct voice font. The voice font may be subsequently used to synthesize the disambiguating information into speech to be played back to a user. In some embodiments, voice fonts assigned to disambiguations may be distinct from the voice fonts used to synthesize the rest of the text (e.g., text dictated by a user) to assist in alerting the user to the fact that this audio corresponds to disambiguating information and not the actual text. For instance, all disambiguations may be synthesized by using a voice with a different pitch than the pitch used in synthesis of other text. In some cases, a voice of a different gender may be assigned to disambiguating information. Other parameters such as speaking rate, prosody, dialect, and accent may be varied as well. However, disambiguation information may be audibly rendered in the same voice font as the rest of the text being played back.

Assigning a voice font to text may comprise including mark-up (e.g., tags) into the text and the mark-up may subsequently be interpreted by a TTS engine. A marked-up segment may, for example, look like: <male/> buy <female/> as in B U Y <male/> some good food. In this example, a TTS engine that recognizes such mark-up tags will be instructed to use a female voice to synthesize the disambiguating information "as in B U Y," and a male voice to synthesize other text. Any suitable mark-up language may be used to indicate a voice font and may be selected according to the particular TTS engine used. Though, a mark-up language is not required to specify a voice font and any of numerous other ways of specifying voice fonts may be used as desired.

After the ambiguous text segment is augmented with disambiguating information (e.g., by annotating the text), acts 806, 810, 812 and 814 may then be repeated for any other text segments identified as being ambiguous. Once all text segments determined to be ambiguous are augmented with disambiguating information and any desired voice fonts assigned, the resulting text may be synthesized into an audio signal which can be played back to the user.

In some instances, a relatively large number of ambiguous segments may be identified in a text selected for play-back. However, audibly rendering relatively large numbers of disambiguation information may be distracting to a user. Accordingly, this number may be limited by prioritizing, ranking, and/or otherwise setting thresholds to filter which disambiguations are rendered and/or to limit the number of words or phrases identified as acoustically ambiguous. Limiting disambiguations may be done as an absolute matter, or may depend on the number of ambiguous words or phrases identified in a given text. For example, in a text with relatively few ambiguous words, lower ranking disambiguations may be rendered that would be eliminated if a greater number of (and higher ranking) ambiguous words or phrases were identified.

In addition, speech recognition technology may be used to limit the number of text segments identified as ambiguous. For instance, confidence scores generated by a speech recognizer for individual words or sub-phrases of the recognized text may be used to filter out homophones (or close homophones) that have high confidence scores (i.e., about which the recognition engine is more certain based, for example, on information from an acoustic or language model, or other contextual information). For instance, in a case where the confidence associated with the recognition of the word "bear" is high, it may not be necessary to provide disambiguation information to the user. Recognition confidence may be used also to form rankings or priorities used to filter which disambiguations are rendered.

Text segments recognized with a "high confidence" may be identified in any of numerous ways, which may depend on the way in which a recognition engine produces confidence scores. For example, the confidence associated with a recognized word or phrase may be compared to a threshold, which may be manually set or automatically determined. If the confidence exceeds the threshold, it may be decided that it is best to omit disambiguation. Another approach involves comparing the confidence associated with a recognized word or phrase with one or more confidences associated with any of its homophones (or other acoustically similar words or phrases), which may also appear in the N-best list. Other ways of reducing the number of disambiguations produced and/or rendered may be used, as the aspects are not limited in this respect.

It should be appreciated that process 800 is merely illustrative and that many aspects of the process may be implemented differently. For instance, some or all acts of the process may be performed in parallel rather than serially (e.g., acts 810, 812, and 814 may be performed in parallel for all text segments identified as ambiguous). Another example involves applying all acts of the process to multiple text portions (e.g., chunks) to be played back while a user is navigating text, rather than only to one portion to be played back (e.g., a single chunk). By applying one or more disambiguation techniques, proofing via audio may be made more convenient and/or accurate. It should also be appreciated that, in some embodiments, use of aspects of process 800 may be restricted to reduce the amount of user distractions. As one non-limiting example, process 800 may be used only when the system has no visual component. As another non-limiting example, disambiguations may be played back only when the user is navigating and/or editing the text in word mode.

As discussed above, the inventors have appreciated that recognition errors are likely to be repeated. Repeat errors typically not only require a user to correct the error, but also may be particularly frustrating for a user seeing the same errors being made multiple times. The inventors have recognized that text proofing may be made more efficient if at least some errors are identified and/or corrected automatically by the system.

Accordingly, in some embodiments, a history of errors previously identified by the user may be maintained, along with the manner in which the errors were corrected. For example, a system may store those recognitions that were subsequently changed by a user and record what correction was made (e.g., record what character, word, or words were used to replace the misrecognition). When the system recognizes a word or multiple words that are stored in the list of misrecognitions, the system can either highlight the word to the user to alert the user to possible misrecognition, or the system may automatically replace the misrecognition with the text the user previously used to replace the misrecognition. Automatic error identification and/or correction may be used in connection with any of the exemplary data-entry systems described herein, or may be used in any other recognition system where a user may be proofing recognized text, as discussed in further detail below.

Figure 9:
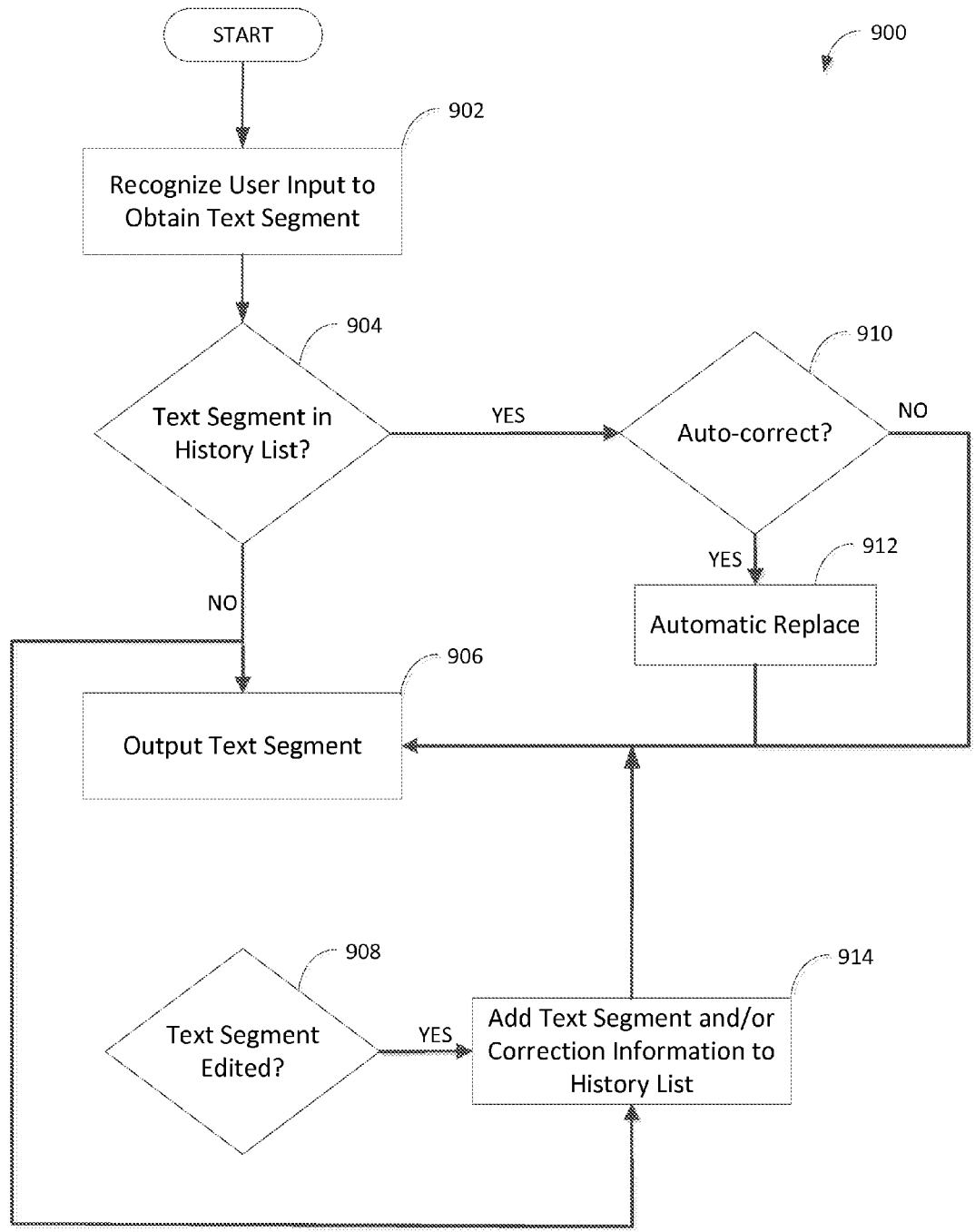
FIG. 9 shows a flowchart of a method of automatically identifying and/or correcting a repeated misrecognition, in accordance with some embodiments.

FIG. 9 is a flow chart illustrating a method of automatic identification and/or correction of recognition errors using a history of previous corrections by the user according to some embodiments. In act 902, a user input is recognized to provide a text segment (e.g., a user may have spoken a chunk of data that is converted into a corresponding chunk of text). In act 904, it is determined whether at least a portion of the text segment is present in the history list. For example, if the text segment corresponds to a text chunk, it may be determined whether the chunk appears in the history list or it may be determined whether one or more words in the chunk appear in the history list (see 904).

The determination may include determining whether the entire text segment is present in the history list, whether any word in the text segment is present in the history list, whether any contiguous combination of words in the text segment is present, or any combination of the above. Any one or combination of these determinations is referred to generically as determining whether the text segment is present in the history list.

If the text segment is not on the history list (or on any history lists if multiple history lists are maintained), the text segment may be presented to the user as is (see act 906). For example, the text segment may be presented visually to the user via a display and/or presented audibly to the user using TTS. The text segment may also be added to the history list as a previously recognized text segment (see 914), but without any corresponding corrected text. Alternatively, adding the text segment to the history list may be omitted or postponed and performed only if the text segment is subsequently edited by the user.

If it is determined, in act 904, that the text segment is part of the history list and includes at least one correction associated with the text segment, then act 910 may be performed to determine whether or not the recognized text segment should be identified to the user, corrected automatically or presented as is to let the user correct manually if the user decides to do so. If it is determined, in act 910, that the recognized text chunk should be automatically corrected, the text segment is automatically corrected in act 912 according to the correction information stored in the history list.

In some embodiments, a history list (or multiple history lists) is maintained that includes previous recognitions, such as a text file, a document in a database, or as any other electronically encoded list or table. For example, the history list may be stored in a computer readable storage medium provided on a data-entry system (e.g., any one of the exemplary data storage systems shown in FIGS. 1A and 1B). Alternatively, one or more history lists may be stored remotely as accessed to perform automatic error identification and/or correction.

FIG. 10A illustrates a portion of an exemplary history list that facilitates automatic identification and/or correction of repeat recognition errors. For example, suppose that a user dictated the data chunk "buy some wine," but the text chunk "buy some fine" was recognized instead. Upon proofing, the user identified the error and corrected "fine" to "wine." As a result, the history list was updated with correction information corresponding to this misrecognition and subsequent correction, as shown in the top row of the history list illustrated in FIG. 10A. In particular, the chunk "Buy some fine" is stored as the misrecognized text chunk, an error flag is set to "Yes" and the corrected chunk "Buy some wine" is stored as correction information associated with the misrecognized text chunk.

It should be appreciated that instead of storing the entire text chunk, the history could store the misrecognized word "fine" and associate the correction information "wine," with the misrecognition (or "some fine" and "some wine" could be stored in the history list or some combination of the above). It will be appreciated that storing entries at the word level (e.g., misrecognition "fine" and correction information "wine") could in some instances be problematic as the misrecognized word may be replaced with the correction information even when that word was actually spoken by the user. Accordingly, storing entries as multiple words, phrases, chunks, etc., may eliminate at least some instances where a word is mistakenly corrected.

The history list shown in FIG. 10A includes additional entries. For example, the text chunk "It's a grizzly bear" is stored as a recognized text chunk and the associated error flag is set to "No." The "No" flag indicates that the recognized text chunk was not corrected by the user after it was recognized. In some instances, though an error was detected (e.g., in the recognized text chunk "meeting at 10 in the morning" as indicated by the associated error flag), a corrected text chunk may not be available so that no correction information is provided. For example, the correction performed by the user may be deemed to have been made for reasons other than correcting a misrecognition.

It should be appreciated that the exemplary history list shown in FIG. 10A is merely exemplary and any particular history list may comprise more information or less information, or information may be stored in different ways. For example, the flag can be indicated in any suitable manner such as using Yes/No, 0/1 or any other suitable indication of whether correction information is available. In some embodiments, no flag is provided at all and only the misrecognized text and, if a correction has been made, any available correction information is stored in the history list.

Additionally, as shown in the exemplary history list in FIG. 10B, only misrecognized text is stored in the history list. That is, previously recognized text is not stored in the history list unless and until the user corrects the text. As discussed above, while the exemplary history lists illustrated store text segments of multiple words, history lists may store text segments of any suitable length including, for example, words, multi-word phrases, sentences and/or text segments of any other length. Storing text segments in a history list in the same chunks as they were input is only one method of building a history list. In addition, though the exemplary history lists of FIGS. 10A and 10B are organized as tables, a history list may be stored in any format as any type of electronic information that may be accessed and processed.

The inventors have appreciated that entries in a history list may become stale. Accordingly, in some embodiments, one or more entries may include an expiration after which the entry is deleted from the history list. An entry may be set to expire after a certain length of time or upon the occurrence of one or more specific events, or some combination of both. For example, an entry may be set to expire after some automatic or user specified length of time, or after the conclusion of a data entry session (or a specified number of sessions) or at the end of some other task that may indicate that one or more entries are no longer relevant or desired. Entries in the history table may be given different expirations, or all entries may be given the same expiration. Additionally, a user may be able to delete one or more entries at any time should the user determine that the entry is not relevant, or is resulting in mistaken automatic corrections, or for any other reason.

Referring back to FIG. 9, act 908 may be performed whenever the user edits a text. If the previously recognized text has not already been included in the history list (e.g., included automatically after being recognized), then when the user begins to edit a text segment (e.g., the user may select and begin to edit a text chunk), the text segment may be added to the history list. When the user has edited the text segment, the corrected text may be added as correction information to the history list in association with the misrecognized text.

It may not be desirable to add the correction information to the history list in all instances. For example, it may be the case that the user is editing a text segment simply because the user would like to replace the existing text as presented and not because the text includes a misrecognition. Under such circumstances, the user may not want the original text segment (which was recognized correctly) to be corrected in this way the next time the user inputs the same text segment (e.g., the next time the user speaks the same word or words).

According to some embodiments, the results from automatic speech recognition may be used to determine whether a user's edits should be inserted in the history list (e.g., whether the user was correcting a recognition error or merely editing the text for other reasons). For example, the N-best list (or lattice) may be consulted to see if the user's edit is amongst the possible recognition results for the text that was edited. That the edited text appears in the N-best list suggests that a recognition error was being corrected and that the edited text may be a good candidate to add as correction information to the history list.

The confidence score from speech recognition for the text segment or word of text being edited may also be consulted to determine if user edits should be included in the history list. For example, if the text segment was recognized with a high level of confidence and/or other recognition candidates had substantially lower confidence scores, it may be determined that no misrecognition occurred and that the user is editing the text segment for a different reason. However, if a text segment or portion of a text segment has a relatively low confidence score, it may be determined that the user is correcting a recognition error. Other methods of determining whether edited text should be entered as correction information may also be used, as the aspects of the invention are not limited in this respect.

As discussed above, according to some embodiments, a potential misrecognition error may be automatically identified, but not automatically corrected. For example, after identifying a potential misrecognition, the user may be alerted by highlighting the potential error or providing the user with alternative text, for example, by searching the N-best list (or lattice) corresponding to the recognized text and/or from previous corrections stored in one or more history lists. The user may then choose to edit the text or keep the text as is.

In this manner, recognition errors may be automatically identified and/or corrected in a text to assist the user in proofing a text. It should be appreciated that the techniques described herein for automatically identifying and/or correcting recognition errors may be used in any of the data-entry systems described herein, or with any device or system where such techniques may facilitate improved text proofing. For example, any of the above-described methods for performing automatic error detection and/or correction may be implemented by the presentation component and/or the presentation component working in conjunction with the recognition component (e.g., accessing the conversion component's N-best list, confidence scores, etc.).

The above-described embodiments of the present invention can be implemented in any of numerous ways. For example, the embodiments may be implemented using hardware, software or a combination thereof. When implemented in software, the software code may be executed on any suitable processor or collection of processors, whether provided in a single computer or distributed among multiple computers.

Components of data-entry systems described herein may be implemented using a single computer or its functionality may be distributed across multiple computers or servers. For instance, ASR engine(s) may be implemented on a computer located at a different location from the input interface. In such a setting, communication among system components/modules/interfaces may be realized in any suitable manner (e.g., wired, wireless, network-based connections) as the present invention is not limited in this respect.

It should be appreciated that a computer may be embodied in any of numerous forms, such as a rack-mounted computer, a desktop computer, a laptop computer, or a tablet computer. Additionally, a computer may be embodied in any device with suitable processing capabilities, including a Personal Digital Assistant (PDA), a smart phone or any other suitable portable or fixed electronic device.

Also, a computer may have one or more input and output devices. These devices may be used, among other things, to present a user interface. Examples of output devices that may be used to provide a user interface include printers or display screens for visual presentation of output, and speakers or other sound generating devices for audible presentation of output. Examples of input devices that may be used for a user interface include keyboards, microphones, and pointing devices, such as mice, touch pads, and digitizing tablets.

Such computers may be interconnected by one or more networks in any suitable form, including a local area network (LAN) or a wide area network (WAN), such as an enterprise network, an intelligent network (IN) or the Internet. Such networks may be based on any suitable technology and may operate according to any suitable protocol and may include wireless networks, wired networks, and/or fiber optic networks.

Figure 11:
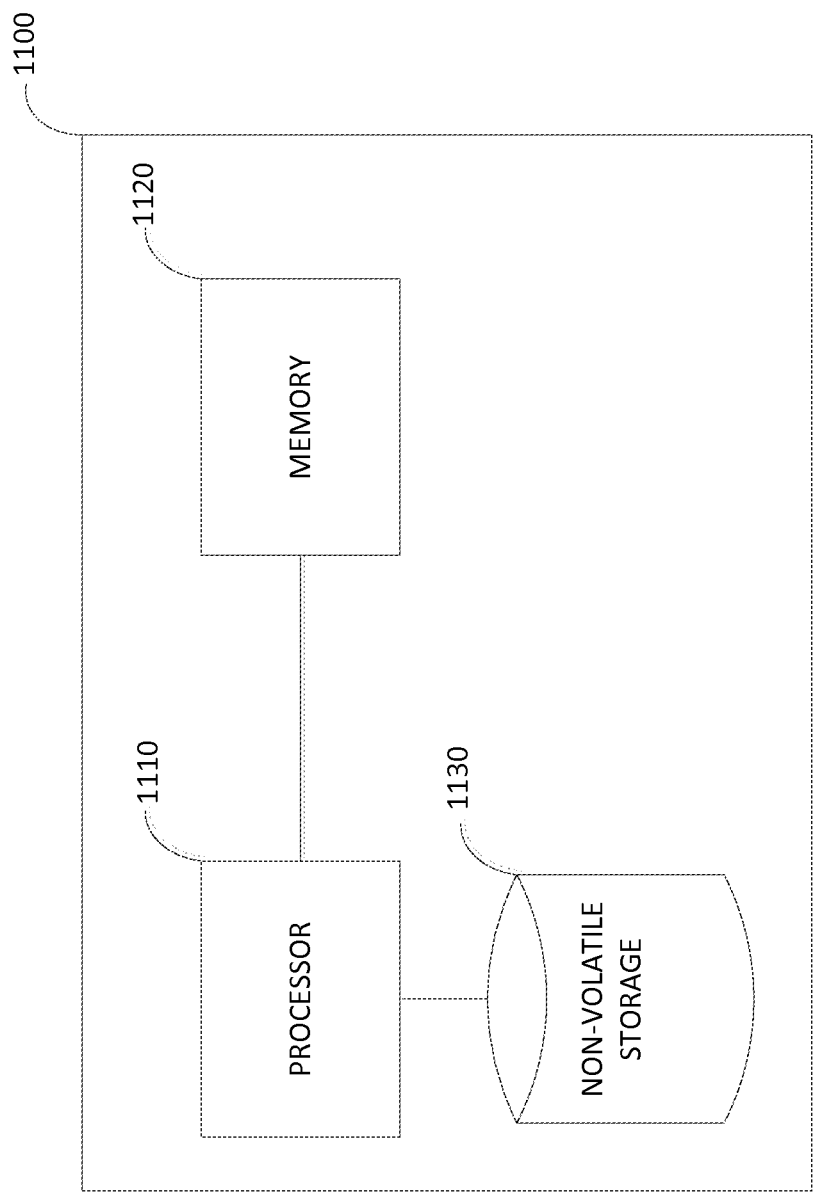
FIG. 11 is a block diagram generally illustrating an example of a computer system that may be used in implementing one or more embodiments.

An illustrative implementation of a computer system 1100 that may be used in connection with any of the embodiments of the invention described herein is shown in FIG. 11. The computer system 1100 may be used as controller 140 in the data-entry system illustrated in FIGS. 1A and/or 1B, and may include one or more processors 1110 and one or more non-transitory computer-readable storage media (e.g., memory 1120 and one or more non-volatile storage media 1130). The processor 1110 may control writing data to and reading data from the memory 1120 and the non-volatile storage device 1130 in any suitable manner, as the aspects of the invention described herein are not limited in this respect. To perform any of the functionality described herein, the processor 1110 may execute one or more instructions stored in one or more computer-readable storage media (e.g., the memory 1120), which may serve as non-transitory computer-readable storage media storing instructions for execution by the processor 1110.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for assisting a user verify accuracy of and/or correct text obtained by performing automatic speech recognition on speech input by the user, the method comprising:

using at least one computer hardware processor to perform:

receiving speech input by the user over a course of multiple user turns as a plurality of speech chunks, each of the plurality of speech chunks comprising speech spoken by the user during a respective single user turn, the plurality of speech chunks including a first speech chunk comprising data corresponding to at least two words spoken by the user;

converting, by performing automatic speech recognition, the plurality of speech chunks to a textual representation comprising a plurality of text chunks, each of the plurality of speech chunks corresponding to a respective one of the plurality of text chunks, the plurality of text chunks comprising a first text chunk corresponding to the first speech chunk and comprising at least two recognized words corresponding to the at least two words; and for each text chunk in the plurality of text chunks:

automatically designating the text chunk of the plurality of text chunks as an active text chunk, whenever the text chunk corresponds to a last speech chunk input by the user; and providing a visual presentation of the active text chunk and at least one other text chunk in the plurality of text chunks such that the active text chunk is visually presented differently than the at least one other text chunk to assist the user, when presented, in proofing the textual representation.

2. The method of claim 1, further comprising:

designating another of the plurality of text chunks as the active text chunk in response to user input indicating that the user would like to select a different one of the plurality of text chunks to be the active text chunk; and modifying the visual presentation to highlight the newly designated active text chunk.

3. The method of claim 1, further comprising deleting at least a portion of the active text chunk from the textual representation in response to receiving user input to delete the at least a portion of the active text chunk.

4. The method of claim 1, further comprising replacing at least a portion of the active text chunk with different text converted from further speech input from the user in response to receiving user input to replace the at least a portion of the active text chunk.

5. The method of claim 1, wherein the visual presentation includes a visual presentation of each of the plurality of text chunks.

6. The method of claim 5, further comprising visually rendering the visual presentation to the user via a display.

7. The method of claim 1, wherein the textual representation is formed, at least in part, of a plurality of words, the method further comprising:

designating one of the plurality of words as an active word in response to a user selecting a word mode;

designating another of the plurality of words as the active word in response to user input indicating that the user would like to select a different one of the plurality of words to be the active word; and modifying the visual presentation to highlight the newly designated active word.

8. The method of claim 1, wherein the textual representation is formed, at least in part, of a plurality of characters, the method further comprising:

designating one of the plurality of characters as an active character in response to a user selecting a character mode;

designating another of the plurality of characters as the active character in response to user input indicating that the user would like to select a different one of the plurality of characters to be the active character; and modifying the visual presentation to highlight the newly designated active character.

9. The method of claim 1, wherein the active text chunk comprises at least two words.

10. A system for assisting a user verify accuracy of and/or correct text obtained by performing automatic speech recognition on speech input by the user, the system comprising:

at least one computer hardware processor configured to perform:

receiving speech input by the user over a course of multiple user turns as a plurality of speech chunks, each of the plurality of speech chunks comprising speech spoken by the user during a respective single user turn, the plurality of speech chunks including a first speech chunk comprising data corresponding to at least two words spoken by the user;

converting, by performing automatic speech recognition, the plurality of speech chunks to a textual representation comprising a plurality of text chunks, each of the plurality of speech chunks corresponding to a respective one of the plurality of text chunks, the plurality of text chunks comprising a first text chunk corresponding to the first speech chunk and comprising at least two recognized words corresponding to the at least two words; and for each text chunk in the plurality of text chunks:

automatically designating the text chunk of the plurality of text chunks as an active text chunk, whenever the text chunk corresponds to a last speech chunk input by the user; and providing a visual presentation of the active text chunk and at least one other text chunk in the plurality of text chunks such that the active text chunk is visually presented differently than the at least one other text chunk to assist the user, when presented, in proofing the textual representation.

11. The system of claim 10, wherein the at least one computer hardware processor is configured to designate another of the plurality of text chunks as the active text chunk in response to user input indicating that the user would like to select a different one of the plurality of text chunks to be the active text chunk, and modifying the visual presentation to highlight the newly designated active text chunk.

12. The system of claim 10, wherein the at least one computer hardware processor is configured to remove at least a portion of the active text chunk from the textual representation in response to receiving an indication from the user to delete the at least a portion of the active text chunk.

13. The system of claim 10, wherein the at least one computer hardware processor is configured to replace at least a portion of the active text chunk in response to receiving user input to replace at least a portion of the active text chunk with different text converted from further data input from the user.

14. The system of claim 10, wherein the at least one computer hardware processor is configured to generate a visual presentation of each of the plurality of text chunks.

15. The system of claim 14, further comprising at least one display coupled to the at least one computer hardware processor to display the visual presentation to the user.

16. The system of claim 10, wherein the textual representation is formed, at least in part, of a plurality of words, and wherein the at least one hardware processor is configured to designate one of the plurality of words as an active word in response to a user selecting a word mode, designate another of the plurality of words as the active word in response to user input indicating that the user would like to select a different one of the plurality of words to be the active word, and modify the visual presentation to highlight the newly designated active word.

17. The system of claim 10, wherein the textual representation is formed, at least in part, of a plurality of characters, and wherein the at least one hardware processor is configured to designate one of the plurality of characters as an active character in response to a user selecting a character mode, designate another of the plurality of characters as the active character in response to user input indicating that the user would like to select a different one of the plurality of characters to be the active character, and modify the visual presentation to highlight the newly designated active character to the user.

18. The system of claim 10, wherein the active text chunk comprises at least two words.

19. At least one non-transitory computer readable medium storing instructions that, when executed on at least one computer, cause the at least one computer to perform a method for assisting a user verify accuracy of and/or correct text obtained by performing automatic speech recognition on speech input by the user, the method comprising:

receiving speech input by the user over a course of multiple user turns as a plurality of speech chunks, each of the plurality of speech chunks comprising speech spoken by the user during a respective single user turn, the plurality of speech chunks including a first speech chunk comprising data corresponding to at least two words spoken by the user;

converting, by performing automatic speech recognition, the plurality of speech chunks to a textual representation comprising a plurality of text chunks, each of the plurality of speech chunks corresponding to a respective one of the plurality of text chunks, the plurality of text chunks comprising a first text chunk corresponding to the first speech chunk and comprising at least two recognized words corresponding to the at least two words; and for each text chunk in the plurality of text chunks:
automatically designating the text chunk of the plurality of text chunks as an active text chunk, whenever the text chunk corresponds to a last speech chunk input by the user; and
providing a visual presentation of the active text chunk and at least one other text chunk in the plurality of text chunks such that the active text chunk is visually presented differently than the at least one other text chunk to assist the user, when presented, in proofing the textual representation.

20. The at least one non-transitory computer readable medium of claim 19, the method further comprising:
designating another of the plurality of text chunks as the active text chunk in response to user input indicating that the user would like to select a different one of the plurality of text chunks to be the active text chunk; and
modifying the visual presentation to highlight the newly designated active text chunk.

21. The at least one non-transitory computer readable medium of claim 19, the method further comprising deleting at least a portion of the active text chunk from the textual representation in response to receiving user input to delete the at least a portion of the active text chunk.

22. The at least one non-transitory computer readable medium of claim 19, the method further comprising replacing at least a portion of the active text chunk with different text converted from further speech input from the user in response to receiving user input to replace at least a portion of the active text chunk.

23. The at least one non-transitory computer readable medium of claim 19, wherein the visual presentation includes a visual presentation of each of the plurality of text chunks.

24. The at least one non-transitory computer readable medium of claim 23, further comprising visually rendering the visual presentation to the user via a display.

25. The at least one non-transitory computer readable medium of claim 19, wherein the textual representation is formed, at least in part, of a plurality of words, the method further comprising:
designating one of the plurality of words as an active word in response to a user selecting a word mode;
designating another of the plurality of words as the active word in response to user input indicating that the user would like to select a different one of the plurality of words to be the active word; and
modifying the visual presentation to highlight the newly designated active word.

26. The at least one non-transitory computer readable medium of claim 19, wherein the textual representation is formed, at least in part, of a plurality of characters, the method further comprising:
designating one of the plurality of characters as an active character in response to a user selecting a character mode;
designating another of the plurality of characters as the active character in response to user input indicating that the user would like to select a different one of the plurality of characters to be the active character; and
modifying the visual presentation to highlight the newly designated active character.

27. The at least one non-transitory computer readable medium of claim 19, wherein the active text chunk comprises at least two words.

* * * * *